US008712632B2

(12) United States Patent
Tuukkanen

(10) Patent No.: US 8,712,632 B2
(45) Date of Patent: Apr. 29, 2014

(54) METHOD AND APPARATUS FOR COMPLEMENTING AN INSTRUMENT PANEL BY UTILIZING AUGMENTED REALITY

(71) Applicant: NAVTEQ B.V., Veldhoven (NL)

(72) Inventor: Marko Tapio Tuukkanen, Schlenzer (DE)

(73) Assignee: NAVTEQ B.V., Veldhoven (NL)

( * ) Notice: Subject to any disclaimer, the term of this patent is extended or adjusted under 35 U.S.C. 154(b) by 0 days.

(21) Appl. No.: 13/754,308

(22) Filed: Jan. 30, 2013

(65) Prior Publication Data

US 2013/0144482 A1 Jun. 6, 2013

(51) Int. Cl.
*G01M 17/00* (2006.01)

(52) U.S. Cl.
USPC .......................... 701/31.5; 701/29.6; 455/418

(58) Field of Classification Search
USPC ..................... 701/29.1–29.9, 31.5, 32.8, 415; 455/41.2, 418
See application file for complete search history.

(56) References Cited

U.S. PATENT DOCUMENTS

2012/0252364 A1* 10/2012 Inabathuni et al. .......... 455/41.2

* cited by examiner

*Primary Examiner* — Thomas Black
*Assistant Examiner* — Luke Huynh
(74) *Attorney, Agent, or Firm* — Ditthavong Mori & Steiner, P.C.

(57) ABSTRACT

An approach is provided for complementing various devices and/or instruments by utilizing augmented reality and providing an adaptive user interface to a user at a user device. A user device determines one or more information items associated with at least one instrument panel of at least one vehicle. Then the user device determines one or more representations of the one or more information items and causes, at least in part, a presentation of the one or more information items at the user device, wherein the user device may complement and/or may be substituted for the at least one instrument panel.

18 Claims, 16 Drawing Sheets

700
701
703
705
2 4 6
X1000 rpm
40 60 80
mph
707a
707
UE 101

800
UE 101
801
701
• Speedometer is inaccurate
• Tachometer is malfunctioning
• Water Temp. indicator light is on
• Navigation Info available 100
USER EQUIPMENT (UE) 101a-101n
APPLICATIONS 103a-103n (E.G., MAP, WEB, MULTIMEDIA, ETC.)
DATA COLLECTION MODULE 115a-115n (E.G., SENSORS, CAMERA, GPS, USER INFO, USE HISTORY, USER PREFS, ETC.)
SENSORS MANAGER 117a-117n
111
COMMUNICATION NETWORK 113
SENSORS 109a-109n
SENSORS MANAGER 121a-121n
SERVICE PROVIDERS 105a-105n
DATABASE 119a-119n
CONTENT/APPLICATIONS (C/A) PROVIDERS 107a-107n 300
START
301
DETERMINE INFORMATION ITEMS ASSOCIATED WITH AN INSTRUMENT PANEL OF A VEHICLE
303
DETERMINE REPRESENTATIONS OF THE INFORMATION ITEMS
305
CAUSE A PRESENTATION OF THE INFORMATION ITEMS AT A DEVICE WHEREIN THE DEVICE SUBSTITUTES FOR THE INSTRUMENT PANEL
END

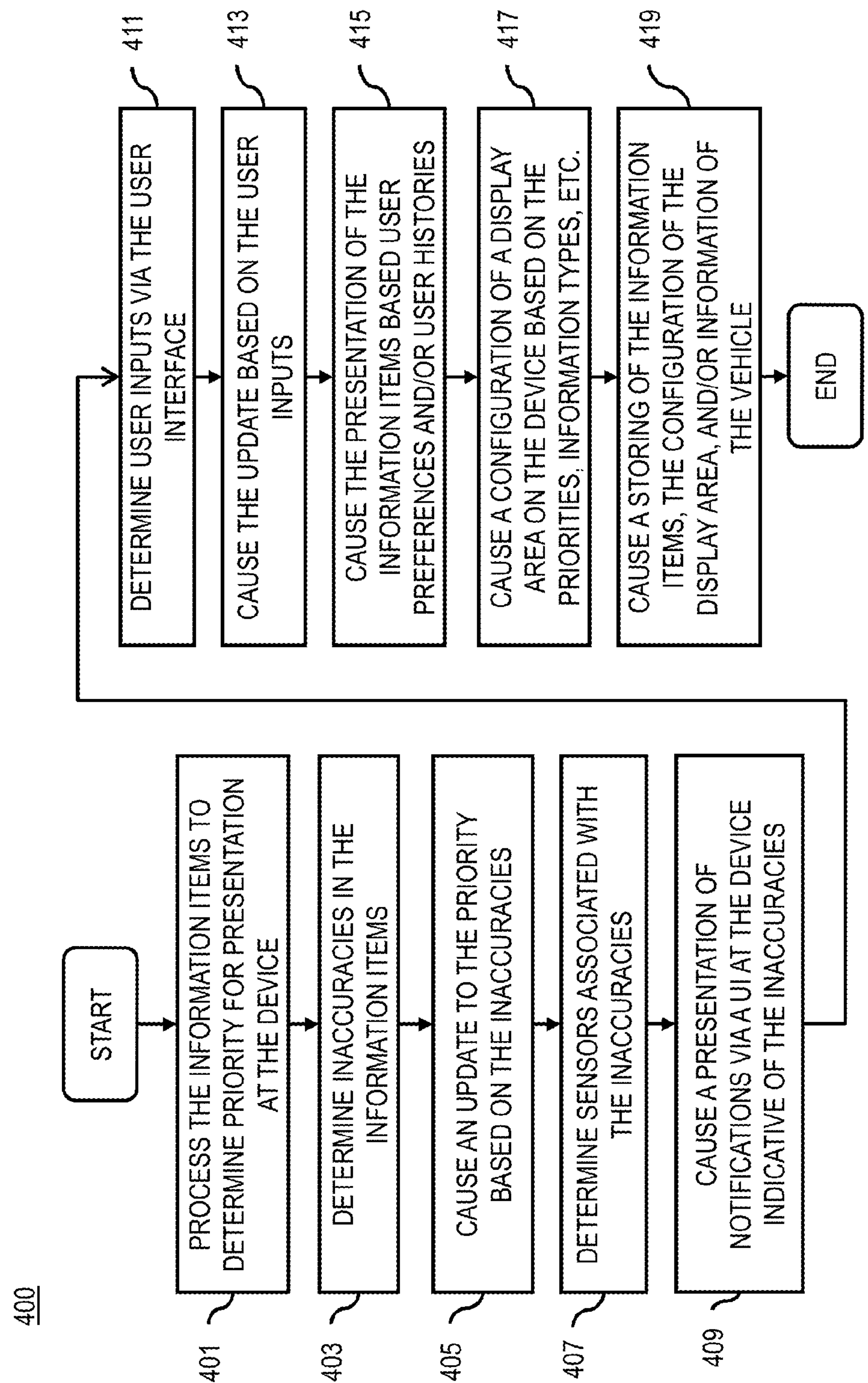
FIG. 4
400
START
PROCESS THE INFORMATION ITEMS TO DETERMINE PRIORITY FOR PRESENTATION AT THE DEVICE
401
DETERMINE INACCURACIES IN THE INFORMATION ITEMS
403
CAUSE AN UPDATE TO THE PRIORITY BASED ON THE INACCURACIES
405
DETERMINE SENSORS ASSOCIATED WITH THE INACCURACIES
407
CAUSE A PRESENTATION OF NOTIFICATIONS VIA A UI AT THE DEVICE INDICATIVE OF THE INACCURACIES
409
DETERMINE USER INPUTS VIA THE USER INTERFACE
411
CAUSE THE UPDATE BASED ON THE USER INPUTS
413
CAUSE THE PRESENTATION OF THE INFORMATION ITEMS BASED USER PREFERENCES AND/OR USER HISTORIES
415
CAUSE A CONFIGURATION OF A DISPLAY AREA ON THE DEVICE BASED ON THE PRIORITIES, INFORMATION TYPES, ETC.
417
CAUSE A STORING OF THE INFORMATION ITEMS, THE CONFIGURATION OF THE DISPLAY AREA, AND/OR INFORMATION OF THE VEHICLE
419
END

940

980
943
110
160
40
100M
LEFT
TURN
921
941
965
963a
963b
961

METHOD AND APPARATUS FOR COMPLEMENTING AN INSTRUMENT PANEL BY UTILIZING AUGMENTED REALITY

BACKGROUND

Service providers (e.g., wireless, cellular, etc.) and device manufacturers are continually challenged to deliver value and convenience to consumers by, for example, providing compelling network services. One area of development has been proliferation of various user devices (e.g., mobile phones, tablets, etc.) in physical spaces (e.g., offices, buildings, homes, etc.), in automobiles (e.g., directional, accelerometer, etc.), personal sensors (e.g., health and wellness), and the like, wherein the user devices may include various wired and/or wireless sensors (e.g., for audio, video, various data measurements, etc.) which may be capable of collecting and displaying various information items associated with other user devices, other sensors, the user environment, and the like. For example, a user may be in or on a vehicle (e.g., an automobile, a boat, a motorcycle, a bicycle, a plane, etc.) where in addition to a user device (e.g., a tablet, a mobile device, etc.), there may be various sensors, gauges, and instrument panels for determining and displaying various information items associated with the vehicle, the user, the user environment, and the like. However, a user may have limited capability for interfacing with the multiple devices and/or for ascertaining relevant and valid information presented via a given device/display. Accordingly, service providers and device manufacturers face significant challenges to enabling utilization of and interface with multiple devices, sensors, displays, and the like at a given setting.

SOME EXAMPLE EMBODIMENTS

Therefore, there is a need for an approach for complementing various devices and/or instruments by utilizing augmented reality and providing an adaptive user interface to the user at a user device.

According to one embodiment, a method comprises determining one or more information items associated with at least one instrument panel of at least one vehicle. The method also comprises determining one or more representations of the one or more information items. The method further comprises causing, at least in part, a presentation of the one or more information items at at least one device, wherein the at least one device substitutes for the at least one instrument panel.

According to another embodiment, an apparatus comprises at least one processor, and at least one memory including computer program code for one or more computer programs, the at least one memory and the computer program code configured to, with the at least one processor, cause, at least in part, the apparatus to determine one or more information items associated with at least one instrument panel of at least one vehicle. The apparatus is also caused to determine one or more representations of the one or more information items. The apparatus is further caused to cause, at least in part, a presentation of the one or more information items at at least one device, wherein the at least one device substitutes for the at least one instrument panel.

According to another embodiment, a computer-readable storage medium carrying one or more sequences of one or more instructions which, when executed by one or more processors, cause, at least in part, an apparatus to determine one or more information items associated with at least one instrument panel of at least one vehicle. The apparatus is also caused to determine one or more representations of the one or more information items. The apparatus is further caused to cause, at least in part, a presentation of the one or more information items at at least one device, wherein the at least one device substitutes for the at least one instrument panel.

According to another embodiment, an apparatus comprises means for determining one or more information items associated with at least one instrument panel of at least one vehicle. The apparatus also comprises means for determining one or more representations of the one or more information items. The apparatus further comprises means for causing, at least in part, a presentation of the one or more information items at at least one device, wherein the at least one device substitutes for the at least one instrument panel.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3 and 4 illustrate flowcharts of various processes for, at least, determining and presenting information items at a user device, according to various embodiments;

DESCRIPTION OF SOME EMBODIMENTS

Examples of a method, apparatus, and computer program for complementing various devices and/or instruments by utilizing augmented reality and providing an adaptive user interface at a user device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

It is noted that embodiments of the approach described herein are applicable to any type of sensor and/or instruments including digital and/or analog instrument panels, environmental sensors, sensors for physical properties, location sensors, cameras, optical sensors, personal sensors, wireless sensors, wired sensors, virtual sensors, network sensors, and the like.

Figure 1:
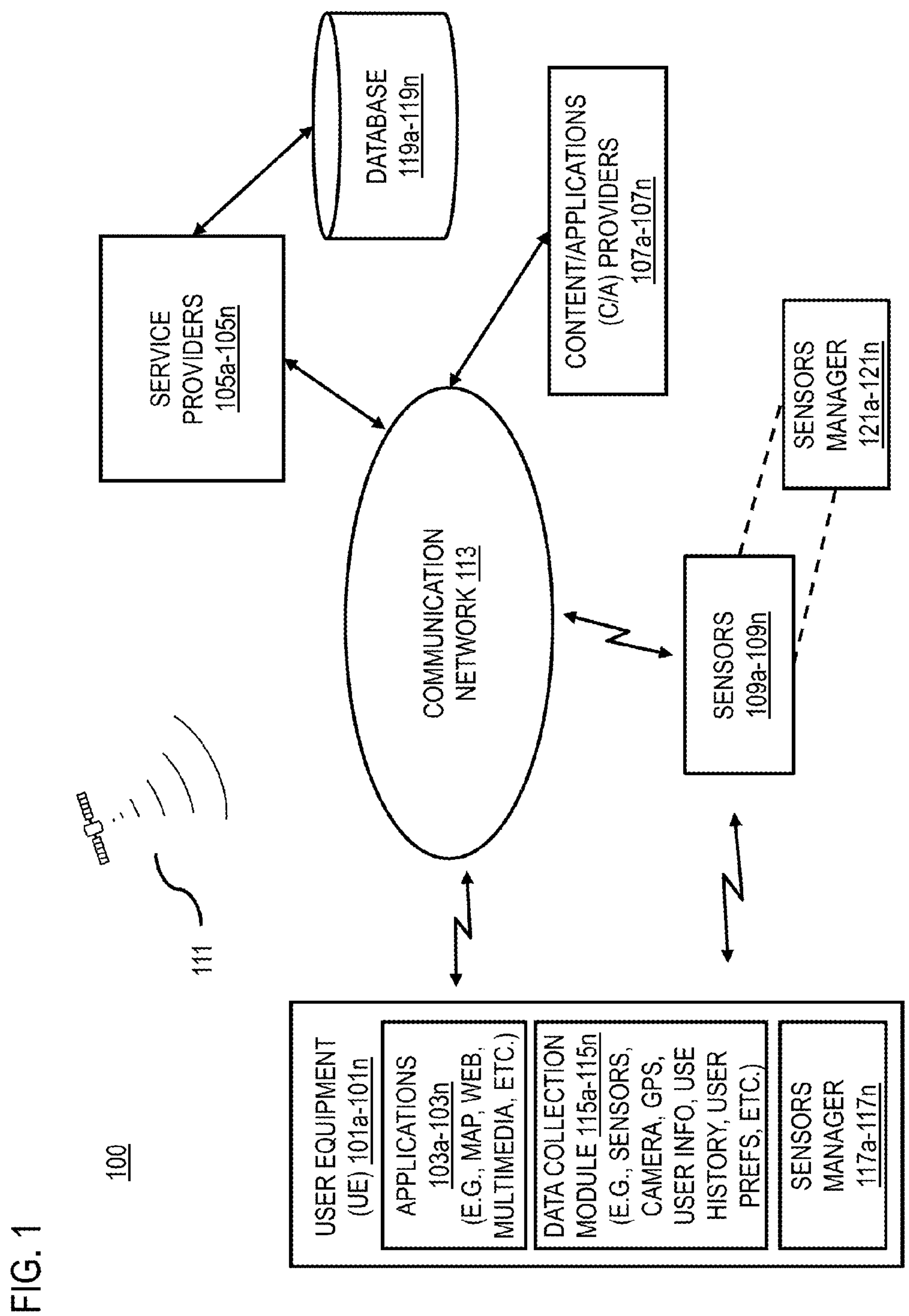
FIG. 1 is a diagram of a system capable of complementing various devices and/or instruments by utilizing augmented reality and providing an adaptive user interface at a user device, according to an embodiment.

FIG. 1 is a diagram of a system capable of complementing various devices and/or instruments by utilizing augmented reality and providing an adaptive user interface at a user device, according to an embodiment. As discussed above, with proliferation of consumer electronic devices (user devices), individuals utilize a range of these user devices (e.g., smartphones, tablets, etc.), which may include various applications, sensors, firmware, software, etc., for various tasks and purposes. Further, these devices may be utilized in various settings and places, for example, at home, at the office, in/on a vehicle (e.g., a car, a boat, a plane, a bike, etc.), and the like. For example, users are increasingly utilizing their user devices in cars for various functionalities, e.g., for navigation information, traffic conditions, information, entertainment, vehicle speed, engine revolutions per minute (RPM), fuel consumption, temperatures inside/outside the vehicle, vehicle diagnostics information, and the like. However, at times, a user may have multpile user devices and other devies to interface with at once, where depending on a given situation, the user may or may not be able to do so. Additionally, although a vehicle may include various devices/instruments for providing various functionalities and/or information, some available user devices utilized in a vehicle may have more functionality, may be more accurate, may be more up to date, may have a better user interface (UI), etc., where the user may prefer to utilize a particular user device instead of the avaiable devices/instruments in a vehicle. Also, some of the vehicles may provide additional information via available communiction channels, for example, via a universal serial bus (USB), Bluetooth, a wireless local area network (WLAN), and the like, which may be accessed by utilizing a user device with appropriate applications and/or software. Moreover, some vehicle manufacturers are interested in allowing integration of user devices with in-vehicle intruments/devices for providing additional functionality and convenience to the users and/or to simplify the instruments in a vehicle. Thereofor, there is a need to integrate user devices with in-vehicle instruments/devices for complementing and/or potentially substituting (e.g., inaccurate, dysfunctional, different style, etc.) one or more devices/instruments (e.g., in an instrument panel) in a vehicle.

To address, at least these problems, a system 100 of FIG. 1 presents the capability for complementing various devices and/or instruments by utilizing augmented reality and providing an adaptive user interface at a user device. More specifically, the system 100 of FIG. 1 introduces the capability of utilizing a user device to collect and/or determine information from various sensors and/or instruments, for example in a vehicle, and provide a user interface for a user to interact with the user device. In one embodiment, a user device may communicate with various sensors in a vehicle for collecting various information items associated with the vehicle, with the user, with the environment of the user, with a service provider, and the like, wherein the information may be presented to the user via a dynamic user interface on the user device. In another embodiment, various sensors on the user device, for example a camera may be utilized to capture an image of various instruments/gauges and determine (e.g., via image recognition) one or more information items associated with one or more instruments/gauges (e.g., a speedometer) in an instrument panel of a vehicle. Additionally, the user device may verify the one or more information items (e.g., compared to another measurement of the same parameter available via another source) and present the one or more information items on the user device. In one embodiment, the user device may determine a plurality of information items available from various sensors and/or instruments in the vehicle for integrating and presenting to the user via a user interface at the user device, wherein the user interface may be dynamically varied/updated according to the user preferences, user configuration, the vehicle type, information type, information priority, a service provider criteria, and the like.

In one embodiment, a user device may be placed on the front of an instrument panel with the intention to cover/ replace the instrument panel. For example, the user device may present vehicle related information, however the user device may also communicate with one or more in-vehicle cameras, where the vehicle information may be shown on top of real-time images/video from the cameras. In such setting, while the user/driver may be viewing and/or interacting with the user device, he will still be able to view images/video from around the vehicle (e.g., front, sides, back). In various settings, the user device may be placed at a pre-designated and/or at a location most suitable to the user.

In one embodiment, the vehicle may be a bicycle, a motorbike, or the like where there may be no available instruments, wherein a user device may be utilized to determine various information items; for example, a geo-location, navigation, a speed, a traffic condition, etc., from one or more service providers for presentation to a user of the vehicle. In one embodiment, a user device may be utilized to compliment and/or replace one or more available instruments in a vehicle. For example, a user device may present geo-location, outside temperature, and navigation information in addition to an available in-vehicle instrument presenting vehicle speed information. In one embodiment, a user device may be utilized to present information in a different format than a format presented on an available in-vehicle instrument. For example, an available instrument in a vehicle may present the vehicle speed information in an analog format, wherein the user device may determine, for example via one or more satellite-based positioning systems (e.g., GPS, GLONASS, etc.) and present the speed information in a digital format. In one embodiment, a user device may be utilized to determine whether one or more information items presented via one or more available instruments in a vehicle are accurate, updated, etc. For example, a user device may be utilized to capture an image of a speedometer gauge (e.g., analog, digital, etc.) of a vehicle, wherein the presented vehicle speed information may be compared to that which may be determined by the user device (e.g., via GPS.)

In one embodiment, a vehicle's electronic system may detect that one or more user devices may be available in the vehicle, wherein the vehicle may cause a displaying of one or more information items available via an integrated instrument panel where the one or more information items may be presented in a device (e.g., a computer, a mobile device, etc.) readable format. In one example, instead of showing a light indicator to warn a user/driver that the level of the vehicle's engine oil may be below a normal level, where the integrated instrument panel may present one or more device readable messages so that a user device may determine one or more additional information items (e.g., one or more error conditions) for presentation to the user.

In one scenario, vehicle manufacturers may decide to provide an instrument panel in a vehicle for determining and/or presenting only minimal and/or mandatory (default) information, where methods and mechanisms of the system 100 may allow user devices to determine and/or present additional and/or enhanced information. Moreover, the system 100 may allow the default instrument panel to be complemented and/or substituted by user devices in the vehicle, while still preserving and presenting the default information. Additionally, the system 100 may allow the vehicle manufacturers to reduce their development and manufacturing costs related to the in-vehicle instruments they provide.

In one scenario, legislation/regulation regarding in-vehicle electronics and instrument panels may vary across different regions/countries; for example, in one country changing the look of a vehicle's original speedometer may not be allowed before an official inspection by a corresponding authority, while in another country, any customization may be allowed as long as the information is presented in some format. The methods of the system 100 may allow adaptation of a UI on a user device to comply with various regulations; for example, a database on the user device and/or in the vehicle may contain information about the regulations in various regions so that if a vehicle enters a different region which may have different regulations, the UI and/or the information may be presented according to the database information for that region. For example, speedometer information of the vehicle may be changed from kilometers per hour (km/h) to miles per hour (mph).

In various scenarios, a user device may physically be placed at a better position in a vehicle so that the sensors of that device may be used with improved efficiency. For example, a tablet device with one or more cameras that is be placed on a center console of the vehicle (e.g., at an angle to the driver), may not be able to accurately detect the driver's condition (e.g., via a camera facing the driver), for example, utilize gaze detection to determine whether the driver may seem to be tired, or may be falling asleep, or may be inattentive, or may have his hands off the steering wheel, etc., but a camera on a tablet, which is placed directly in front of the driver (e.g., in the instruments panel), may easily be able to detect the driver's condition. In one embodiment, the gaze detection information may be utilized for activating one or more functions on the user device and/or on vehicle, for example, activating a forward view of the vehicle on the user device. I one embodiment, an augmented reality (AR) view may be presented on the user device, wherein the AR view may include a forward view of the vehicle, instrument panel information, map, guidance and traffic information, etc.

In one embodiment, a user device may include a plurality of cameras where at least a first camera is facing a vehicle's integrated instrument panel, and a second camera is facing the driver/user. Additionally, the vehicle may include one or more integrated external cameras. In one use case scenario, a camera on the user device that may be facing the instruments panel may capture an image of the instruments in the panel and utilize one or more image recognition methods and/or a near field communication filed (NFC) tag for identifying the instruments, the vehicle's make, model, and type. In various embodiments, one or more sensors (e.g., cameras, microphones, etc.) may be utilized to determine the use of vehicle controls by the user, or detect other events in the vehicle and by the user, for example, detect user gestures or facial expressions for determining user input for interfacing with the user device and/or with one or more instruments of the vehicle.

In various scenarios, the one or more cameras may be utilized to present one or more views as a background in an augmented instrument panel view, present a camera view when the information may be related to user actions, for example, a rear view camera may be displayed on the user device when the vehicle is being moved in a reverse direction, side camera view when switching lanes, and the like. In one instance, a camera view may be shared with one or more other services and/or applications, for example, record a trip and share it with friends via one or more social network services.

In various embodiments, the UI on a user device may be customized according to user preferences for presentation of information determined from an instruments panel and one or more sensors. For example, a user may add/remove one or more elements to/from of a UI presentation of an instruments panel view, resize the UI, change the positions of the UI elements, drag and drop elements in the UI area, and the like. I believe the ability for customization is important to be included. In one embodiment, a user customization may be limited and/or overridden by the system 100 so that one or more information items that may not have been selected by the user, may still be presented; for example, if the user has removed the engine oil indicator (e.g., light, gauge, etc.) from the user interface, the system 100 may still present it if the indicator presents information that may be detrimental to the engine and where the user may need to take an action (e.g., to avoid damaging the vehicle.)

In one embodiment, the UI on a user device may be adapted for interfacing with a plurality of vehicles and/or according to user preferences on a certain vehicle. In various one embodiments, a user may configure a user device so that the device includes a substantially same UI when used in a plurality of vehicles, or the user device may present a customized UI per vehicle. In one embodiment, the system 100 may store user preferences, user device configuration, and vehicle information in a database at a service provider and/or at a user device. In one embodiment, a vehicle manufacturer may provide a pre-configured or a preferred UI for a user device that is to be used in a vehicle.

In one embodiment, a UI on a user device may be adapted according to one or more variables associated with a vehicle for presenting priority information; for example, as speed of the vehicle increases, the speedometer information may be shown in brighter colors and in larger characters where other information items (e.g., not critical, secondary, etc.) may be temporarily removed from presentation in the UI. For example, information which may immediately damage the vehicle would have the highest priority over "nice to have" information, for instance, the speedometer is inaccurate as showing 1 km/h less than actual speed. In one embodiment, a UI dialog may present to the user one or more options for disregarding certain information items (e.g., less important, variances, inaccuracies, etc.) and/or accepting/acknowledging the certain information items so that the system 100 does not present future warnings of the accepted/acknowledged information items.

In one embodiment, a user device may collect information over a longer period of time for creating a historical statistics of the use of a vehicle where the statistical data may be used to detect abnormalities or normal "wearing" associated with various components of the vehicle. In one instance, when the oil in the engine of a vehicle becomes old (heavily used) and/or the oil level is lower than normal certain events may occur, for example, the RPM of the engine may go higher even under normal driving conditions, the engine temperature may be continuously higher, the fuel consumption may increase, and the like. In such a scenario, the system 100 could notify the user to change the engine oil based on the events information or suggest for the user to inspect the vehicle. In another scenario, speedometer of a vehicle may be inaccurate, for example, due to a change in a type of tires on the vehicle (e.g., winter tires), wherein the system 100 may record the speedometer information over a certain traveled distance (e.g., the next 100 km) before notifying the user of the inaccuracy. In one instance, as the tires wear out for a while, the accuracy of the vehicle's speedometer may improve and the user may be presented with the changes in the speedometer information. In another example, maintenance suggestions for various components of the vehicle may be associated with one or more events, which may be determined from the collected data, for instance, a suggestion to replace the engine oil, spark plugs, and the like.

As shown in FIG. 1, in one embodiment, the system 100 includes user equipment (UE) 101*a*-101*n* (also collectively referred to as a UE 101 and/or UEs 101), which may be utilized to execute one or more applications 103*a*-103*n* (also collectively referred to as applications 103) including games, social networking, web browser, media application, user interface (UI), map application, web client, etc. to communicate with other UEs 101, one or more service providers 105*a*-105*n* (also collectively referred to as service provider 105), one or more content/applications providers 107*a*-107*n* (also collectively referred to as C/A providers 107), one or more sensors 109*a*-109*n* (also collectively referred to as sensors 109), GPS satellite 111, and/or with other components of a communication network 113 directly and/or over the communication network 113. In one embodiment, the UEs 101 may include data collection modules 115*a*-115*n* (also collectively referred to as data collection module 115) for determining and/or collecting data associated with the UEs 101, one or more sensors of the UE 101, one or more users of the UEs 101, applications 103, one or more content items, and the like.

In one embodiment, the UEs 101 may include sensors manager 117*a*-117*n* (also collectively referred to as sensors manager 117) for managing various sensors. In one embodiment, the service provider 105 may include and/or have access to one or more database 119*a*-119*n* (also collectively referred to as database 119), which may include various user information, user profiles, user preferences, one or more profiles of one or more user devices (e.g., device configuration, sensors information, etc.), service provider information, other service provider information, and the like. In addition, the UE 101 can execute an application 103 that is a software client for storing, processing, and/or forwarding the sensor data to other components of the system 100. In one embodiment, the sensors 109 may include and/or may be associated with one or more sensors managers 121*a*-121*n* ((also collectively referred to as sensors manager 121) for managing the sensors 109, processing data collected by the sensors 109, and/or interfacing with the UEs 101, the service providers 105, other components of the system 100, or a combination thereof. In various embodiments, the sensors 109 may provide various information items associated with a vehicle, wherein the information items may be determined by the sensors 109 and/or may be determined in conjunction with the service providers 105 and/or the C/A 107.

In various embodiments, the UEs 101 may interact with the sensors 109, wherein the UEs 101 and/or the sensors 109 may include a combination of various sensors, for example, one or more wearable sensors, accelerometers, physiological sensors, biometric sensors, vehicle diagnostic sensors, vehicle information sensors, and the like. By way of example, connectivity between the UEs 101 and the sensors 109 and/or sensors manager 121 may be facilitated by short range wireless communications, for example, NFC protocol, Bluetooth®, WLAN, MirrorLink™, ANT/ANT+™, ZigBee®, etc. and/or via a wired communication bus/hub, a universal serial bus (USB) data port, and the like.

In one embodiment, a user may wear one or more sensors (e.g., a microphone, a camera, an accelerometer, etc.) for monitoring and collection of sensor data (e.g., images, audio, etc.) For example, the sensors may capture accelerometer, image, and audio information at periodic intervals. The UEs 101 (e.g., via the application 103 and/or the sensors manager 117) may store the data temporarily, perform any needed processing and/or aggregation, and send the data to the service providers 105 continuously and/or at periodic intervals. In one embodiment, the data sent includes, at least in part, timestamps, sensor data (e.g., vehicle data, environmental data, etc.), and/or context information. By way of example, the operational states of the sensors on the UEs 101 and/or the sensors 109 may include setting and/or modifying related operational parameters including sampling rate, parameters to sample, transmission protocol, activity timing, etc. By way of example, the sensors manager 117 and/or 121 includes one or more components for providing adaptive filtering of sensors and/or sensor data. In one embodiment, the sensors manager 117 and/or 121 may execute at least one algorithm for executing functions of the sensors managers.

In one embodiment, the system 100 may determine one or more information items associated with at least one instrument panel of at least one vehicle. In one embodiment, a user device (e.g., a tablet, a mobile device, etc.) may be utilized in a vehicle to determine one or more information items associated with the vehicle, with the user, with the environment of the user or the vehicle, and the like, where the vehicle may include various instruments/gauges for presenting one or more information items. For example, a vehicle may include an instrument panel, which may include one or more instruments/gauges for presenting information associated with the vehicle. In one embodiment, the user device may access/receive one or more information items via one or more communication links from one or more sensors associated with the at least one vehicle, one or more service providers, or a combination thereof. For example, the vehicle may include various sensors for providing vehicle speed information, diagnostics information, oil pressure, engine RMP, and the like. In one embodiment, the one or more information items may be determined via one or more optical sensors (e.g., cameras), one or more audio sensors (e.g., microphones), or a combination thereof on the at least one device. For example, the user device may include a camera which may be used to capture an image of an instrument (e.g., a speedometer) in the vehicle's instrument panel, where the image may be processed (e.g., image detection) to determine information presented by the instrument (e.g., vehicle speed.) In one example, audio sensors on the user device may be used to detect sound produced by an in-vehicle audio system (e.g., a radio and loud speakers), where the detected sound may be analyzed to determine sound availability, quality, and the like.

In one embodiment, the system 100 may determine one or more representations of the one or more information items. In one embodiment, the user device may utilize one or more applications to represent an information item (e.g., determined from an in-vehicle sensor, an instrument, etc.) at the user device. For example, the user device may determine vehicle speed, vehicle location, and ambient temperature, and then represent the determined information via a UI at the user device.

In one embodiment, the system 100 may cause, at least in part, a presentation of the one or more information items at at least one device, wherein the at least one device substitutes for the at least one instrument panel. In one embodiment, the user device may be used to present one or more information items where the user device may complement and/or may be substituted for one or more instruments in the instrument panel. For example, an in-vehicle instrument panel may include a speedometer and a tachometer where the user device can determine the information presented by the speedometer and the tachometer (e.g., via an image capture of the instruments, via sensors associated with the instruments, etc.) and then the user device may represent the information via a UI at the user device. In one embodiment, the user device may be physically placed such that the user views the user device instead of the one or more instruments in the instrument panel. For example, the user device may be placed in a mounting dock in the instrument panel and in front of the one or more instruments.

In one embodiment, the system 100 may process and/or facilitate a processing of the one or more information items to determine priority information, wherein the presentation of the one or more information items at the at least one device is based, at least in part, on the priority information. In various embodiments, the user device may determine a priority level for the one or more information items, for example, based on a type of an information item, a user preference, a user defined threshold value, urgency of the information item, service provider information, and the like. For example, a warning alert associated with an information item related to the vehicle may be prioritized higher and may be quickly presented at the user device. In one embodiment, a service provider may include priority level for an information item so that the information item may be quickly presented at the user device. In one example, a threshold value may be defined so that the RPM information is only displayed if it is within a certain range, or if it is over a certain limit (e.g., reaching a "red" zone, optimal point for changing gears, etc.)

In one embodiment, the system 100 may determine, at the at least one device, one or more inaccuracies in the one or more information items. In one embodiment, the user device may compare an information item determined from a sensor and/or from an instrument with a corresponding information item determined by the user device and/or by a service provider. For example, the user device may capture an image of a speedometer of a vehicle and determine that the vehicle speed is at 60 miles per hour (mph), the user device may compare the speed information with speed information determined from a navigation application (e.g., with GPS assistance), where the speed may be determined to be 63 mph, which could indicate a potential inaccuracy in the speedometer information. In one embodiment, the user device may determine an inaccuracy between an information item determined from a sensor on the vehicle (e.g., engine temperature sensor reading) and the same information item determined from an in-vehicle instrument (e.g., engine water temperature meter) providing the same type of information, wherein the two information items may be the same or may be different. In one embodiment, the user device may utilize information from a plurality of sensors in order to determine an inaccuracy of an information item. For example, if the engine water temperature determined from an instrument in an instrument panel does not match or it is not substantially close to the same information reported by an engine water temperature sensor, then the user device may analyze other information from other sensors, which may be relevant to the engine temperature (e.g., engine oil temperature.)

In one embodiment, the system 100 may cause, at least in part, an update to the priority information based, at least in part, on the one or more inaccuracies. In one embodiment, the user device may update one or more priorities of one or more information items based on the one or more inaccuracies. For example, an in-vehicle instrument may indicate a normal engine temperature, wherein a sensor information may indicate that the engine temperature is outside of a normal range, in which case, the user device may re-prioritize (e.g., with higher priority) the engine temperature information.

In one embodiment, the system 100 may determine one or more sensors associated with the one or more inaccuracies. In one embodiment, the user device may utilize one or more information items from various sensors and/or from a service provider to determine/identify a sensor and/or an instrument that may be presenting inaccurate information. For example, an in-vehicle speedometer instrument may be deemed inaccurate when its speed information is compared to speed information determined from GPS information.

In one embodiment, the system 100 may cause, at least in part, a presentation of one or more notifications via a user interface at the at least one device indicative of the one or more inaccuracies. In one embodiment, the user device may present one or more notifications, via a UI on the user device, indicating one or more potential inaccuracies associated with one or more in-vehicle instruments and/or sensors. For example, the user device may present two different vehicle speed information determined via two different sensors and/or instruments. In another example, the user device may present an engine maintenance notification determined from in-vehicle information item and an engine maintenance notification determined from a service provider.

In one embodiment, the system 100 may determine one or more user inputs via the user interface. In one embodiment, the user device may determine an input from the user, via a UI on the user device, which may indicate a selection of an information item, an action, a display option, and the like.

In one embodiment, the system 100 may cause, at least in part, the update based, at least in part, on the one or more user inputs. In one embodiment, the user device may update the priority level of one or more information items based on one or more inputs by the user. For example, a user may select to view vehicle speed information available from GPS information on the user device. In one embodiment, the user selection may indicate that it is priority to continuously present navigation information on the user device from available GPS information.

In one embodiment, the system 100 may cause, at least in part, the presentation of the one or more information items based, at least in part, on one or more user preferences, one or more user histories, or a combination thereof. In one embodiment, the user device may determine one or more user preferences and/or user history for presenting the one or more information items on the user device. For example, the user preferences may indicate that the user prefers certain information items presented in certain formats. In another example, a user history may indicate that over a certain time period, certain information items have been presented on the user device in a certain format.

In one embodiment, the system 100 may cause, at least in part, a configuration of a display area on the at least one device based, at least in part, on the one or more priorities, one or more information types, the on one or more user preferences, the one or more user histories, the one or more inaccuracies, or a combination thereof. In one embodiment, the user device may configure display area of the user device based on the priority of the information items available for display. For example, based on user preferences, information on vehicle speed, tire pressure, and engine water temperature may have high priority for presentation on the user device display, wherein the display area may be configured and/or optimized for presentation of those priority information items. In one embodiment, the user device may determine that an instrument (e.g., a tachometer) in the instrument panel of the vehicle may be malfunctioning and therefore information related to that instrument may be determined from another source (e.g., a related sensor) and prioritized for presentation on the user device. In one embodiment, the configuration of the display area on the at least one device, the presentation of the one or more information items, or a combination thereof is based, at least in part, on a type of the vehicle. In one embodiment, the user device may determine a vehicle type (e.g., a car, a boat, a motorbike, etc.); for example, from radio frequency identification (RFID) data, and available instruments so that the user device may be configured accordingly for displaying various information items while the user device is in use in/on that vehicle.

In one embodiment, the system 100 may cause, at least in part, a storing of the one or more information items, the configuration of the display area, information of the vehicle, or a combination thereof at the at least one device. In one embodiment, the user device may store at the user device and/or at a service provider (e.g., a cloud service) the information items that may be associated with a vehicle, configuration of the user device, user preferences, user history, and the like, wherein the information items may be available to a user of the user device whether while in/on the vehicle or while away from the vehicle. In various examples, a user may utilize a user device in conjunction with a plurality of different vehicles, at different time, at different locations, and the like. In one embodiment, the user device may access and/or retrieve information associated with a user, a user device, and a vehicle from a service provider.

Although various embodiments are discussed with respect to complementing various devices and/or instruments by utilizing augmented reality and providing an adaptive user interface at a user device, it is contemplated that embodiments of the approach described herein are applicable to any type of sensory data including environmental, physical properties, material, location sensors, user device, and the like. In one embodiment, the sensory data refers, for instance, to data that indicates state of a sensor or an instrument, state of a user device, a vehicle, or user environment and/or the inferred state of the sensor or the instrument, of the user device, of the vehicle, or of the user.

By way of example, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 may be any type of mobile terminal, fixed terminal, or portable terminal including a mobile handset, station, unit, device, healthcare diagnostic and testing devices, product testing devices, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs can support any type of interface to the user (such as "wearable" circuitry, etc.). Further, the UEs

101 may include various sensors for collecting data associated with a vehicle, a user, a user's environment, and/or with a UE 101, for example, the sensors may determine and/or capture audio, video, images, atmospheric conditions, device location, user mood, ambient lighting, user physiological information, device movement speed and direction, and the like.

By way of example, the UEs 101, the service provider 105, the C/A providers 107, and the sensors 109 may communicate with each other and other components of the communication network 113 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, one or more entities of the system 100 may interact according to a client-server model with the applications 103 and/or the sensors manager 117 of the UE 101. According to the client-server model, a client process sends a message including a request to a server process, and the server process responds by providing a service (e.g., context-based grouping, social networking, etc.). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
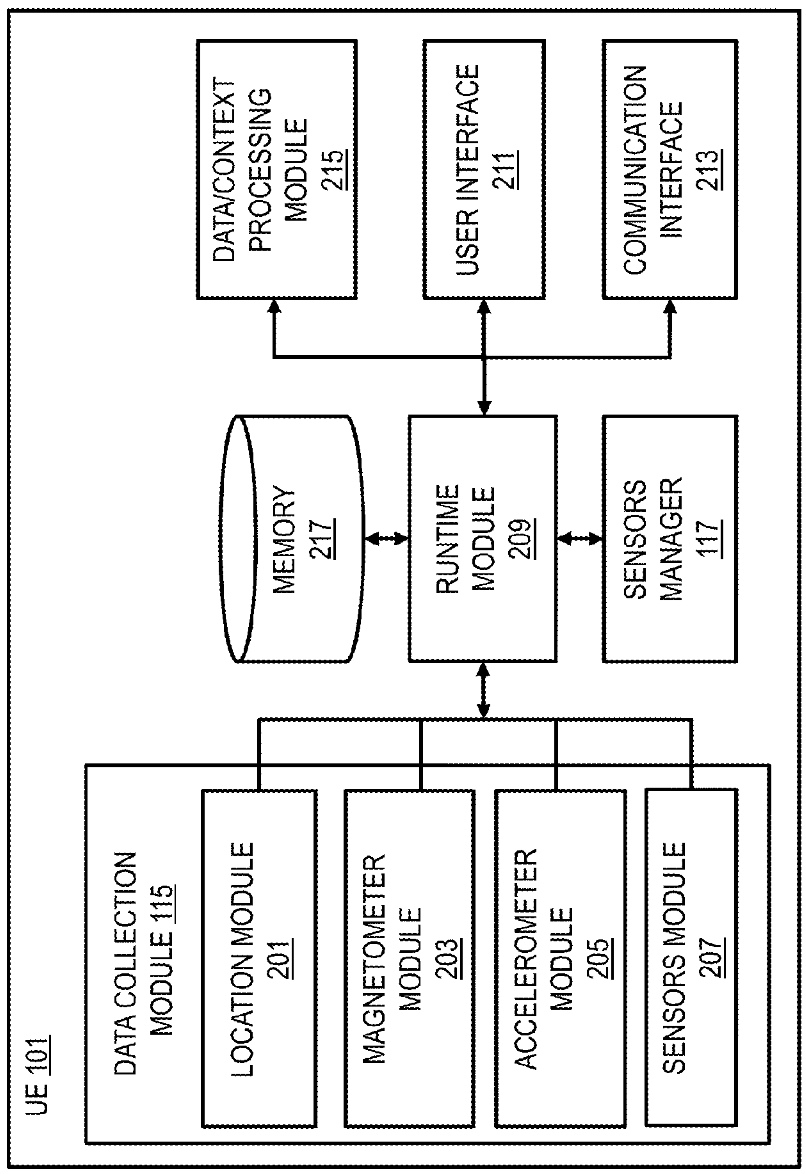
FIG. 2 is a diagram of the components of a user equipment capable of determining and presenting information items associated with one or more sensors and/or instruments, according to various embodiments.

FIG. 2 is a diagram of the components of a user equipment capable of determining and presenting information items associated with one or more sensors and/or instruments, according to various embodiments. By way of example, a UE 101 includes one or more components for receiving, collecting, generating, determining, and/or analyzing data associated with various sensors and/or instruments for a vehicle. It is contemplated that the functions of these components may be combined in one or more components or performed by other components of equivalent functionality. In this embodiment, the UE 101 includes a data collection module 115 that may include one or more location modules 201, magnetometer modules 203, accelerometer modules 205, and sensors modules 207. Further, the UE 101 may also include a runtime module 209 to coordinate the use of other components of the UE 101, a user interface 211, a communication interface 213, a data/context processing module 215, memory 217, and sensors manager 117. The applications 103 of the UE 101 can execute on the runtime module 209 utilizing the components of the UE 101.

The location module 201 can determine a user's location, for example, via location of a UE 101. The user's location can be determined by a triangulation system such as GPS, assisted GPS (A-GPS), Cell of Origin, or other location extrapolation technologies. Standard GPS and A-GPS systems can use satellites 111 to pinpoint the location of a UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 201 may also utilize multiple technologies to detect the location of the UE 101. Location coordinates (e.g., GPS coordinates) can give finer detail as to the location of the UE 101 when media is captured. In one embodiment, GPS coordinates are stored as context information in the memory 217 and are available to the sensors manager 117, the service provider 105, and/or to other entities of the system 100 via the communication interface 213. Moreover, in certain embodiments, the GPS coordinates can include an altitude to provide a height. In other embodiments, the altitude can be determined using another type of altimeter. In certain embodiments, the location module 201 can be a means for determining a location of the UE 101, an image, or used to associate an object in view with a location.

The magnetometer module 203 can be used in finding horizontal orientation of the UE 101. A magnetometer is an instrument that can measure the strength and/or direction of a magnetic field. Using the same approach as a compass, the magnetometer is capable of determining the direction of a UE 101 using the magnetic field of the Earth. The front of a media capture device (e.g., a camera) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer can be stored in memory 217, made available to other modules and/or applications 103 of the UE 101, and/or transmitted via the communication interface 213 to one or more entities of the system 100.

The accelerometer module 205 can be used to determine vertical orientation of the UE 101. An accelerometer is an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 205 can determine the angle the UE 101 is pointed as compared to Earth's gravity. In certain embodiments, the magnetometer module 203 and accelerometer module 205 can be means for ascertaining a perspective of a user. This perspective information may be stored in the memory 217, made available to other modules and/or applications 103 of the UE 101, and/or sent to one or more entities of the system 100.

In various embodiments, the sensors module 207 may include various sensors for detecting and/or capturing data associated with the user and/or the UE 101. For example, the sensors module 207 may include sensors for capturing environmental (e.g., atmospheric) conditions, audio, video, images, location information, temperature, user physiological data, user mood (e.g., hungry, angry, tired, etc.), user interactions with the UEs 101, and the like. In certain embodiments, information collected from and/or by the data collection module 115 can be retrieved by the runtime module 209, stored in memory 217, made available to other modules and/or applications 103 of the UE 101, and/or sent to one or more entities of the system 100.

The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, a microphone, etc. Input can be via one or more methods such as voice input, textual input, typed input, typed touch-screen input, other touch-enabled input, etc.

In one embodiment, the communication interface 213 can be used to communicate with one or more entities of the system 100. Certain communications can be via methods such as an internet protocol, messaging (e.g., SMS, MMS, etc.), or any other communication method (e.g., via the communication network 113). In some examples, the UE 101 can send context information associated with the UE 101 and/or the user to the service provider 105, C/A providers 107, and/or to other entities of the system 100.

The data/context processing module 215 may be utilized in determining context information from the data collection module 115 and/or applications 103 executing on the runtime module 209. For example, it can determine user activity, vehicle type, in-vehicle available instruments, application and/or service utilization, user information, type of information included in the data, information that may be inferred from the data, and the like. The data may be shared with the applications 103, and/or caused to be transmitted, via the communication interface 213, to the service provider 105 and/or to other entities of the system 100. The data/context processing module 215 may additionally be utilized as a means for determining information related to the user, a vehicle, instruments, sensors, gauges, various data, the UEs 101, and the like. Further, data/context processing module 215, for instance, may manage (e.g., organizes) the collected data based on general characteristics, rules, logic, algorithms, instructions, etc. associated with the data. In certain embodiments, the data/context processing module 215 can infer higher level context information from the context data such as favorite locations, significant places, common activities, interests in products and services, etc.

Figure 3:
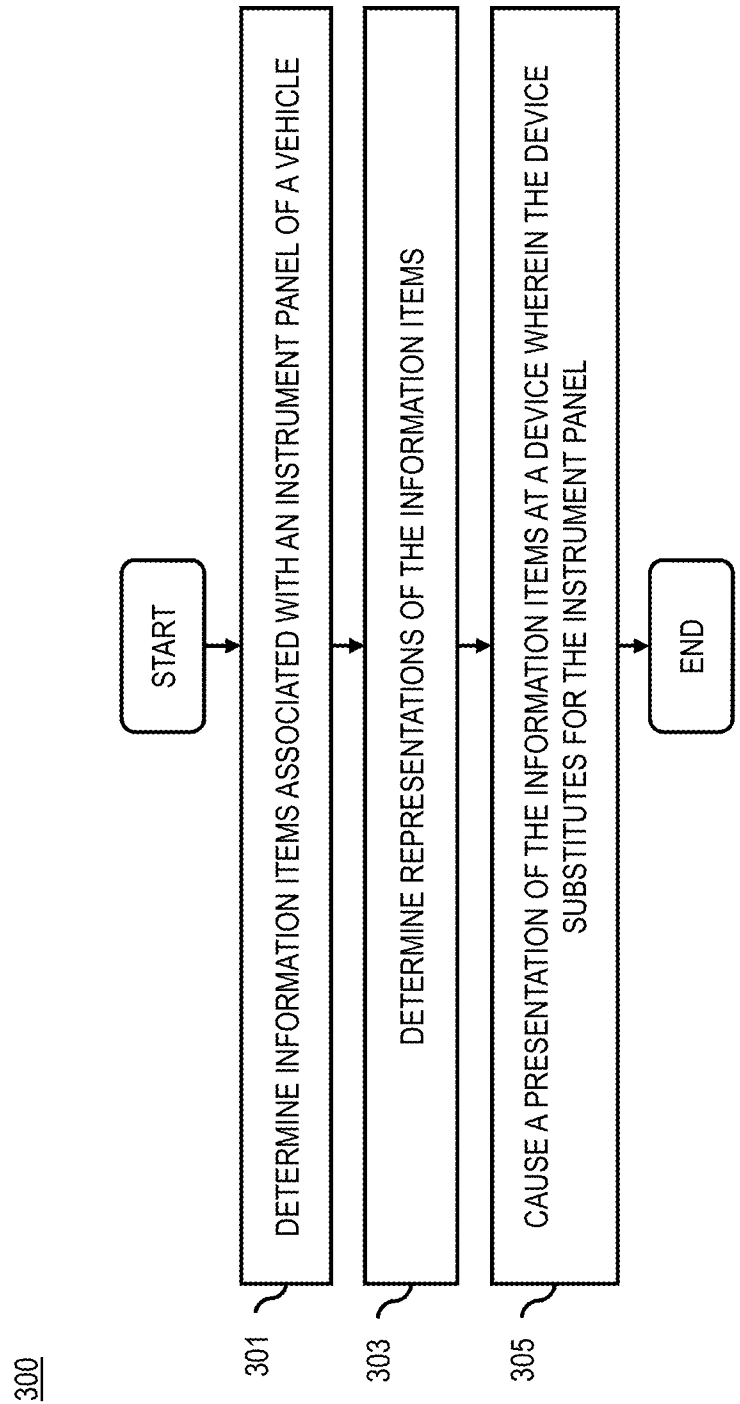
Figure 10:
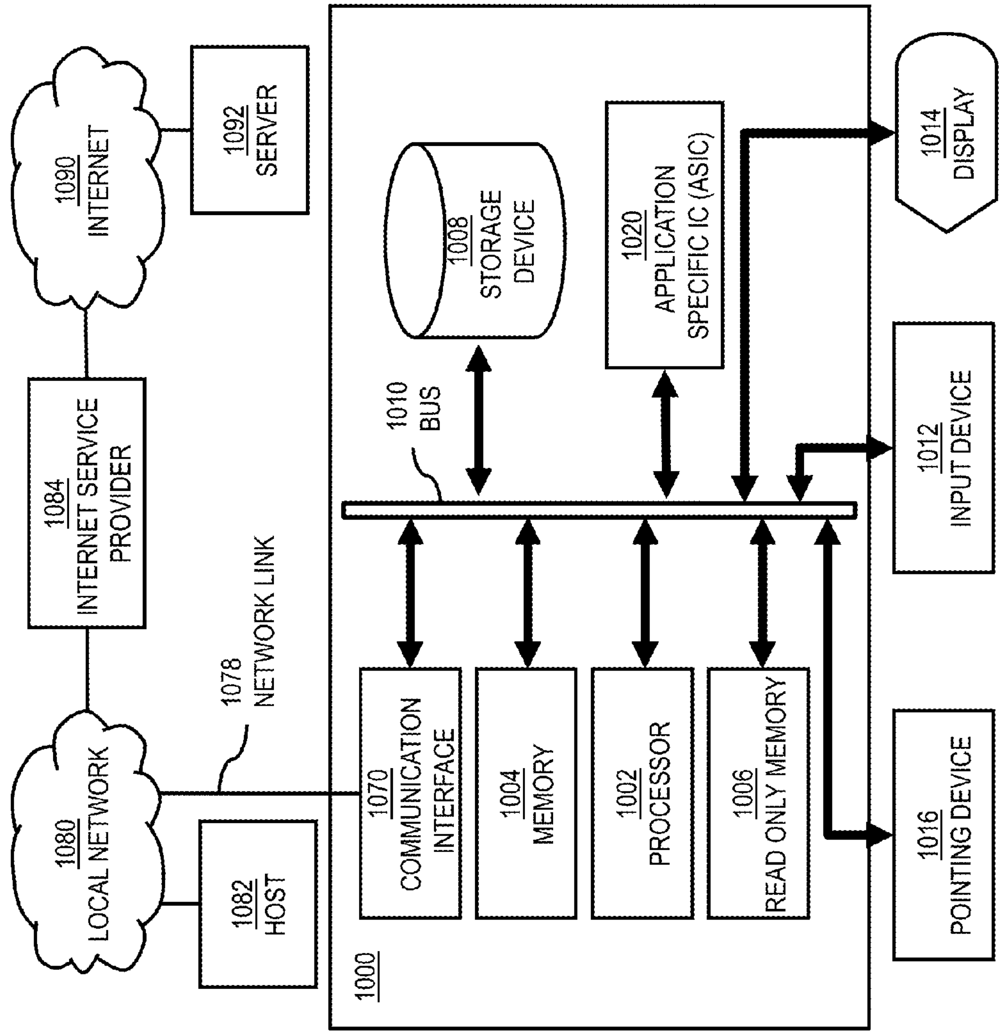
FIG. 10 is a diagram of hardware that can be used to implement an embodiment of the invention.

FIGS. 3 and 4 illustrate flowcharts of various processes for, at least, determining and presenting information items at a user device, according to various embodiments. In various embodiments, the applications 103, the DC module 115, and/or the sensors manager 117 may perform processes 300 and 400 that may be implemented in, for instance, a chip set including a processor and a memory as shown in FIG. 10. As such, the applications 103, the DC module 115, and/or the sensors manager 117 can provide means for accomplishing various parts of the process 300 and 400 as well as means for accomplishing other processes in conjunction with other components of the system 100. Throughout these processes, the applications 103, the DC module 115, and/or the sensors manager 117 may be referred to as completing various portions of the processes 300 and 400, however, it is understood that other components of the system 100 can perform some of and/or all of the process steps. Further, in various embodiments, the DC module 115 and/or the sensors manager 117 may be implemented in one or more entities of the system 100.

Referring to FIG. 3, the process 300 begins at step 301 where the DC module 115 and/or the sensors manager 117 determine one or more information items associated with at least one instrument panel of at least one vehicle. In one embodiment, a user device (e.g., a tablet, a mobile device, etc.) may be utilized in a vehicle to determine one or more information items associated with the vehicle, with the user, with the environment of the user or the vehicle, and the like, where the vehicle may include various instruments/gauges for presenting one or more information items. For example, a vehicle may include an instrument panel, which may include one or more instruments/gauges for presenting information associated with the vehicle. In one embodiment, the user device may access/receive one or more information items via one or more communication links from one or more sensors associated with the at least one vehicle, one or more service providers, or a combination thereof. For example, the vehicle may include various sensors for providing vehicle speed information, diagnostics information, oil pressure, engine RMP, and the like. In one embodiment, the one or more information items may be determined via one or more optical sensors (e.g., cameras), one or more audio sensors (e.g., microphones), or a combination thereof on the at least one device. For example, the user device may include a camera which may be used to capture an image of an instrument (e.g., a speedometer) in the vehicle's instrument panel, where the image may be processed (e.g., image detection) to determine information presented by the instrument (e.g., vehicle speed.) In one example, audio sensors on the user device may be used to detect sound produced by an in-vehicle audio system (e.g., a radio and loud speakers), where the detected sound may be analyzed to determine sound availability, quality, and the like.

In step 303, the applications 103 determine one or more representations of the one or more information items. In one embodiment, the user device may utilize one or more applications to represent an information item (e.g., determined from an in-vehicle sensor, an instrument, etc.) at the user device. For example, the user device may determine vehicle speed, vehicle location, and ambient temperature, and then represent the determined information via a UI at the user device.

In step 305, the applications 103 cause, at least in part, a presentation of the one or more information items at at least one device, wherein the at least one device substitutes for the at least one instrument panel. In one embodiment, the user device may be used to present one or more information items where the user device may complement and/or may be substituted for one or more instruments in the instrument panel. For example, an in-vehicle instrument panel may include a speedometer and a tachometer where the user device can determine the information presented by the speedometer and the tachometer (e.g., via an image capture of the instruments, via sensors associated with the instruments, etc.) and then the user device may represent the information via a UI at the user device. In one embodiment, the user device may be physically placed such that the user views the user device instead of the one or more instruments in the instrument panel. For example, the user device may be placed in a mounting dock in the instrument panel and in front of the one or more instruments.

Referring to FIG. 4, the process 400 begins at step 401 where the DC module 115 and/or the sensors manager 117 process and/or facilitate a processing of the one or more information items to determine priority information, wherein the presentation of the one or more information items at the at least one device is based, at least in part, on the priority information. In various embodiments, the user device may determine a priority level for the one or more information items, for example, based on a type of an information item, a user preference, a user defined threshold value, urgency of the information item, service provider information, and the like. For example, a warning alert associated with an information item related to the vehicle may be prioritized higher and may be quickly presented at the user device. In one embodiment, a service provider may include priority level for an information item so that the information item may be quickly presented at the user device. In one example, a threshold value may be defined so that the RPM information is only displayed if it is within a certain range, or if it is over a certain limit (e.g., reaching a "red" zone, optimal point for changing gears, etc.)

In step 403, the applications 103 and/or the DC module 115 determine, at the at least one device, one or more inaccuracies in the one or more information items. In one embodiment, the user device may compare an information item determined from a sensor and/or from an instrument with a corresponding information item determined by the user device and/or by a service provider. For example, the user device may capture an image of a speedometer of a vehicle and determine that the vehicle speed is at 60 miles per hour (mph), the user device may compare the speed information with speed information determined from a navigation application (e.g., with GPS assistance), where the speed may be determined to be 63 mph, which could indicate a potential inaccuracy in the speedometer information. In one embodiment, the user device may determine an inaccuracy between an information item determined from a sensor on the vehicle (e.g., engine temperature sensor reading) and the same information item determined from an in-vehicle instrument (e.g., engine water temperature meter) providing the same type of information, wherein the two information items may be the same or may be different. In one embodiment, the user device may utilize information from a plurality of sensors in order to determine an inaccuracy of an information item. For example, if the engine water temperature determined from an instrument in an instrument panel does not match or it is not substantially close to the same information reported by an engine water temperature sensor, then the user device may analyze other information from other sensors, which may be relevant to the engine temperature (e.g., engine oil temperature.)

In step 405, the applications 103 and/or the DC module 115 cause, at least in part, an update to the priority information based, at least in part, on the one or more inaccuracies. In one embodiment, the user device may update one or more priorities of one or more information items based on the one or more inaccuracies. For example, an in-vehicle instrument may indicate a normal engine temperature, wherein a sensor information may indicate that the engine temperature is outside of a normal range, in which case, the user device may re-prioritize (e.g., with higher priority) the engine temperature information.

In step 407, the applications 103 and/or the DC module 115 determine one or more sensors associated with the one or more inaccuracies. In one embodiment, the user device may utilize one or more information items from various sensors and/or from a service provider to determine/identify a sensor and/or an instrument that may be presenting inaccurate information. For example, an in-vehicle speedometer instrument may be deemed inaccurate when its speed information is compared to speed information determined from GPS information.

In step 409, the applications 103 cause, at least in part, a presentation of one or more notifications via a user interface at the at least one device indicative of the one or more inaccuracies. In one embodiment, the user device may present one or more notifications, via a UI on the user device, indicating one or more potential inaccuracies associated with one or more in-vehicle instruments and/or sensors. For example, the user device may present two different vehicle speed information determined via two different sensors and/or instruments. In another example, the user device may present an engine maintenance notification determined from in-vehicle information item and an engine maintenance notification determined from a service provider.

In step 411, the applications 103 determine one or more user inputs via the user interface. In one embodiment, the user device may determine an input from the user, via a UI on the user device, which may indicate a selection of an information item, an action, a display option, and the like.

In step 413, the applications 103 and/or the DC module 115 cause, at least in part, the update based, at least in part, on the one or more user inputs. In one embodiment, the user device may update the priority level of one or more information items based on one or more inputs by the user. For example, a user may select to view vehicle speed information available from GPS information on the user device. In one embodiment, the user selection may indicate that it is priority to continuously present navigation information on the user device from available GPS information.

In step 415, the applications 103 and/or the DC module 115 cause, at least in part, the presentation of the one or more information items based, at least in part, on one or more user preferences, one or more user histories, or a combination thereof. In one embodiment, the user device may determine one or more user preferences and/or user history for presenting the one or more information items on the user device. For example, the user preferences may indicate that the user prefers certain information items presented in certain formats. In another example, a user history may indicate that over a certain time period, certain information items have been presented on the user device in a certain format.

In step 417, the applications 103 cause, at least in part, a configuration of a display area on the at least one device based, at least in part, on the one or more priorities, one or more information types, the on one or more user preferences, the one or more user histories, the one or more inaccuracies, or a combination thereof. In one embodiment, the user device may configure display area of the user device based on the priority of the information items available for display. For example, based on user preferences, information on vehicle speed, tire pressure, and engine water temperature may have high priority for presentation on the user device display, wherein the display area may be configured and/or optimized for presentation of those priority information items. In one embodiment, the user device may determine that an instrument (e.g., a tachometer) in the instrument panel of the vehicle may be malfunctioning and therefore information related to that instrument may be determined from another source (e.g., a related sensor) and prioritized for presentation on the user device. In one embodiment, the configuration of the display area on the at least one device, the presentation of the one or more information items, or a combination thereof is based, at least in part, on a type of the vehicle. In one embodiment, the user device may determine a vehicle type (e.g., a car, a boat, a motorbike, etc.); for example, from radio frequency identification (RFID) data, and available instruments so that the user device may be configured accordingly for displaying various information items while the user device is in use in/on that vehicle.

In step 419, the applications 103 and/or the DC module 115 cause, at least in part, a storing of the one or more information items, the configuration of the display area, information of the vehicle, or a combination thereof at the at least one device. In one embodiment, the user device may store at the user device and/or at a service provider (e.g., a cloud service) the information items that may be associated with a vehicle, configuration of the user device, user preferences, user history, and the like, wherein the information items may be available to a user of the user device whether while in/on the vehicle or while away from the vehicle. In various examples, a user may utilize a user device in conjunction with a plurality of different vehicles, at different time, at different locations, and the like. In one embodiment, the user device may access and/or retrieve information associated with a user, a user device, and a vehicle from a service provider.

Figure 5:
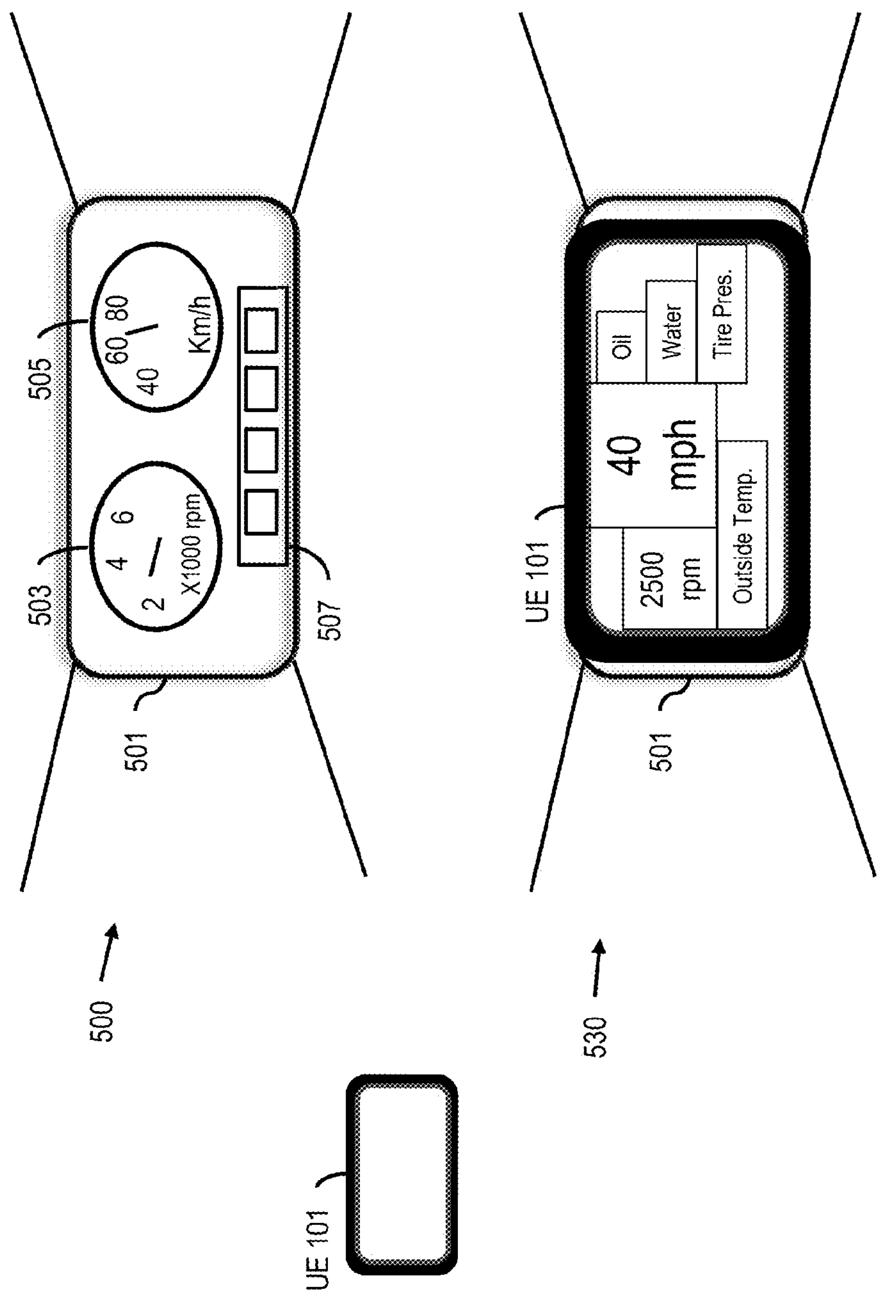
FIGS. 5 and 6 illustrate example diagrams of various instrument panels and user devices, according to various embodiments.
Figure 6:
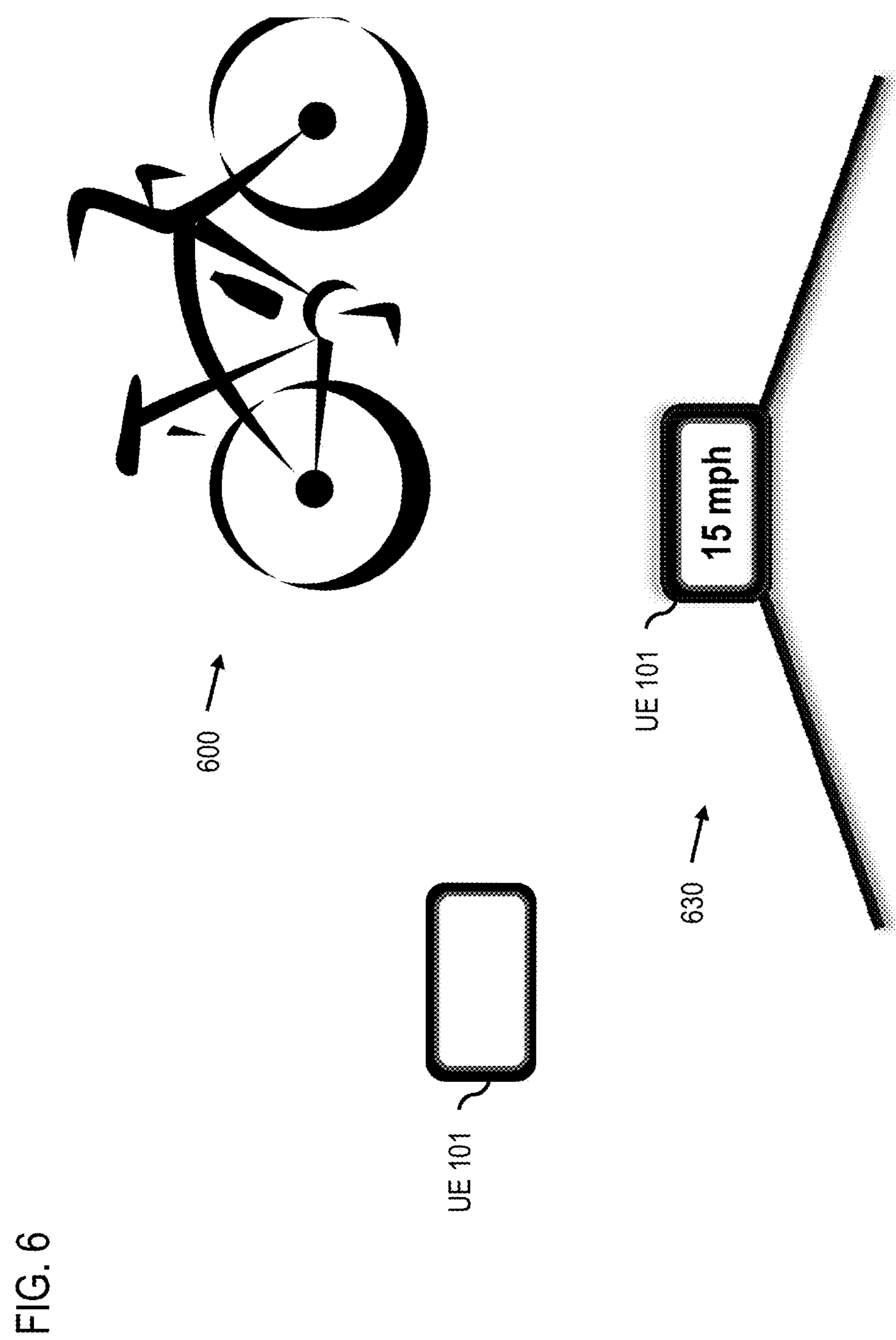

FIGS. 5 and 6 illustrate example diagrams of various instrument panels and user devices, according to various embodiments.

FIG. 5 includes diagram 500 and 530. In one embodiment, the diagram 500 includes an instrument panel 501 in a vehicle, wherein there are various instruments 503, 505, and 507. In one example, the instruments 503 and 505 may present available information in an analog format, for example, 503 is a tachometer which presents information related to the vehicle's engine's rotational speed (e.g., in rounds per minute, RPM) and the 505 is a speedometer that presents the vehicle's speed information in an analog format (e.g., in kilometers per hour, (Km/h)). Further, the 501 instrument panel may include various indicator lights 507 that each may illuminate for providing a notification about an event associated with one or more components and/or systems of the vehicle. Further, FIG. 5 includes a UE 101 which may be utilized to capture an image of the instrument panel 501, or communicate with various available sensors in the vehicle, and/or communicate with one or more service providers for obtaining various information items associated with the user, with the vehicle, with available services, with the user/vehicle environment, and the like. In one embodiment, the UE 101 is utilized as an instrument panel in diagram 530, wherein information similar to that of in the instrument panel 501 is presented. In various embodiments, the UE 101 may be mounted in a docking station in front of the instrument panel 501 or at a location suitable to the user. In one example, the UE 101 in the diagram 530 may determine the presented information in 530 via one or more in-vehicle sensors, or by capturing an image of the instrument panel 500, or from one or more service providers. In various embodiments, the UE 101 may convert, translate, amend, etc., the determined and/or available information according to user preferences, user history, user configuration, vehicle information, geo-location, and the like. For example, the UE 101 in the 530 diagram presents the speed information in a digital format and in miles per hour (MPH) unit instead of the original Km/h unit, presents the RPM information in digital format, presents the textual indicators related to the engine oil and water levels and/or temperatures, vehicle's tire pressure information, temperature outside the vehicle, and the like.

FIG. 6 depicts a bicycle 600 which may have no gauges/instruments for presenting any information related to the bicycle, the user environment, geo-location, and the like. In one embodiment, a UE 101 may be utilized on the bicycle in diagram 630 for presenting one or more information items, for example, speed, ambient temperature, navigation, location-based services, and the like.

Figure 7:
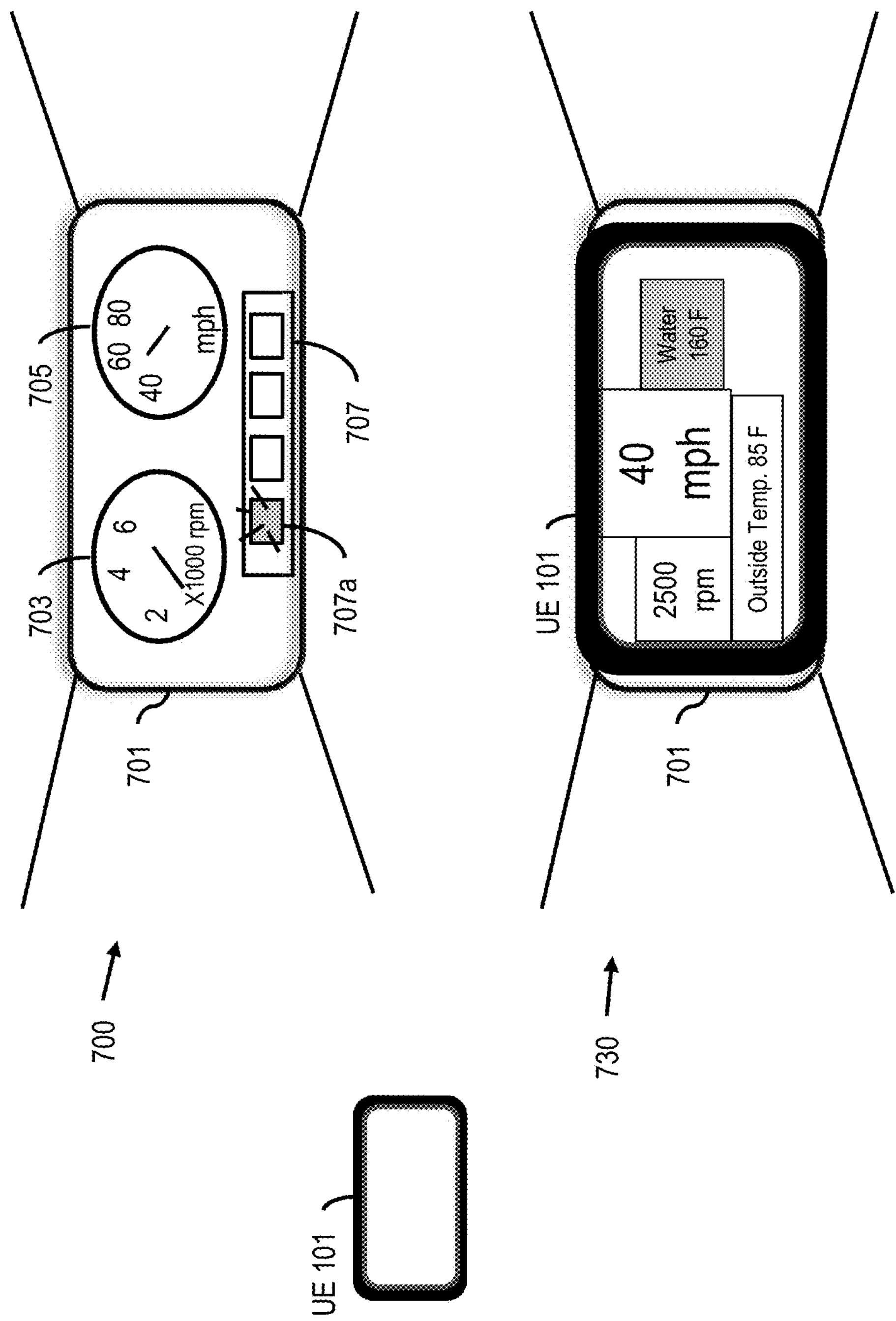
FIGS. 7 and 8 illustrate various user interfaces at a user device utilized in implementation of the processes of FIGS. 3 and 4, according to various embodiments.
Figure 8:
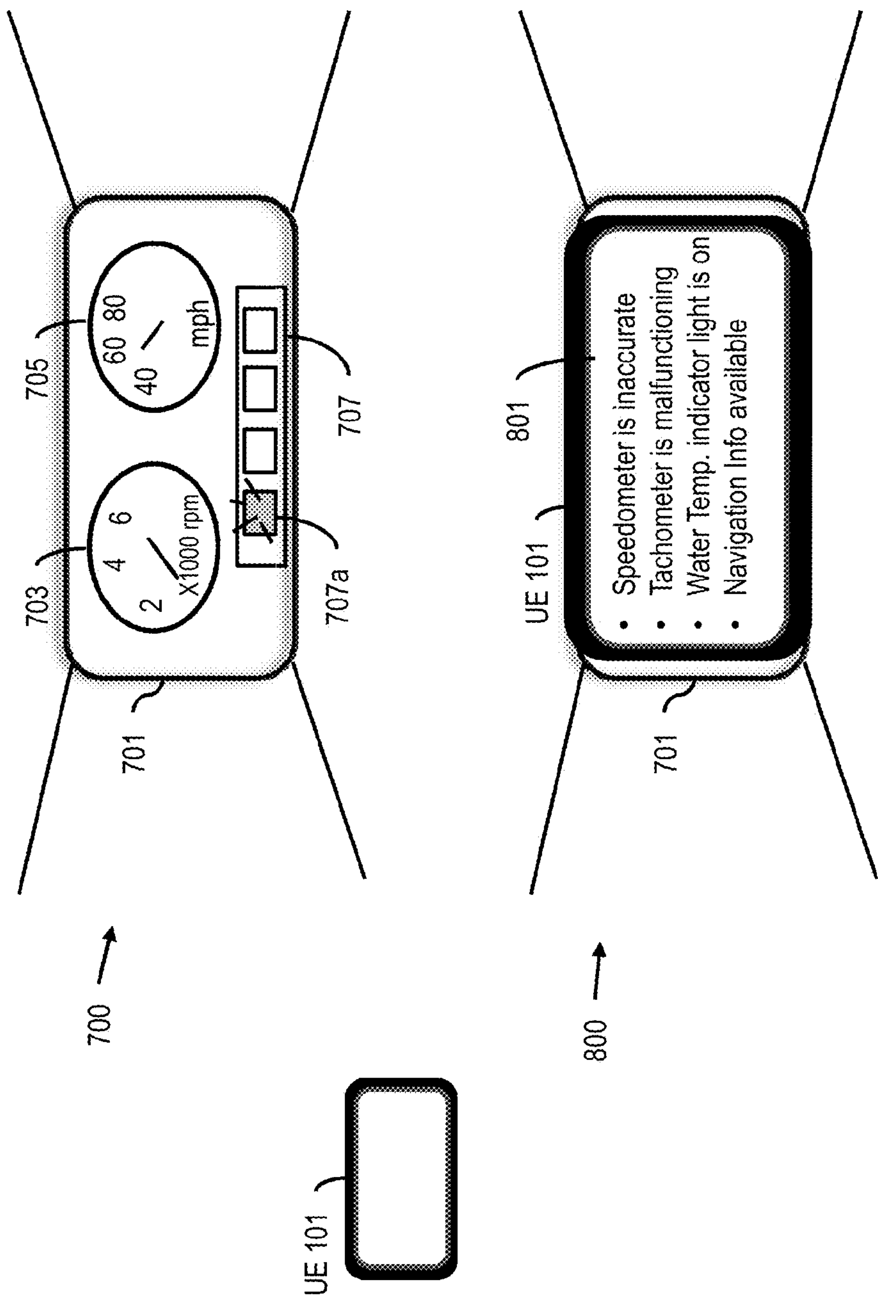

FIGS. 7 and 8 illustrate various user interfaces at a user device utilized in implementation of the processes of FIGS. 3 and 4, according to various embodiments;

FIG. 7 depicts diagrams 700 and 730, where in 700, the instrument panel 701 includes instruments 703, 705, and light indicator panel 707. In one scenario, a UE 101 may determine from in-vehicle sensors and/or from a service provider that the instruments 703 and 705 may be malfunctioning, for example, the 703 tachometer is not showing a reading and the speedometer 705 seems to be inaccurate (e.g., showing a vehicle speed faster than what may be.) Additionally, the UE 101 may analyze an image from the instrument panel 701 and determine that an indicator light **707*a* is flashing. In one embodiment, the UE 101 may be utilized as in the diagram 730 to present information associated with the vehicle and the instrument panel 701. For example, in diagram 730 the UE 101 may present information items on the tachometer 703 (e.g., 2000 RPM), the speedometer (e.g., 40 MPH) 705, and water temperature 707*a* at 160-degree Fahrenheit. Further, the UE 101** may determine a priority of the information items by placement and/or highlighting the information items in the display area.

FIG. 8 includes the instrument panel 701 and instrument panel 800, wherein UI 801 presents information items associated with the instruments of the instrument panel 701 as well as presenting other information items based on user preference, user history, vehicle information, geo-location, UE 101 configuration, and the like where the user may select to execute any available actions and/or retrieve additional information items. In one embodiment, a user may interface with the UE 101 via in-vehicle control mechanisms, a touch screen, voice commands, and the like.

Figure 9A:
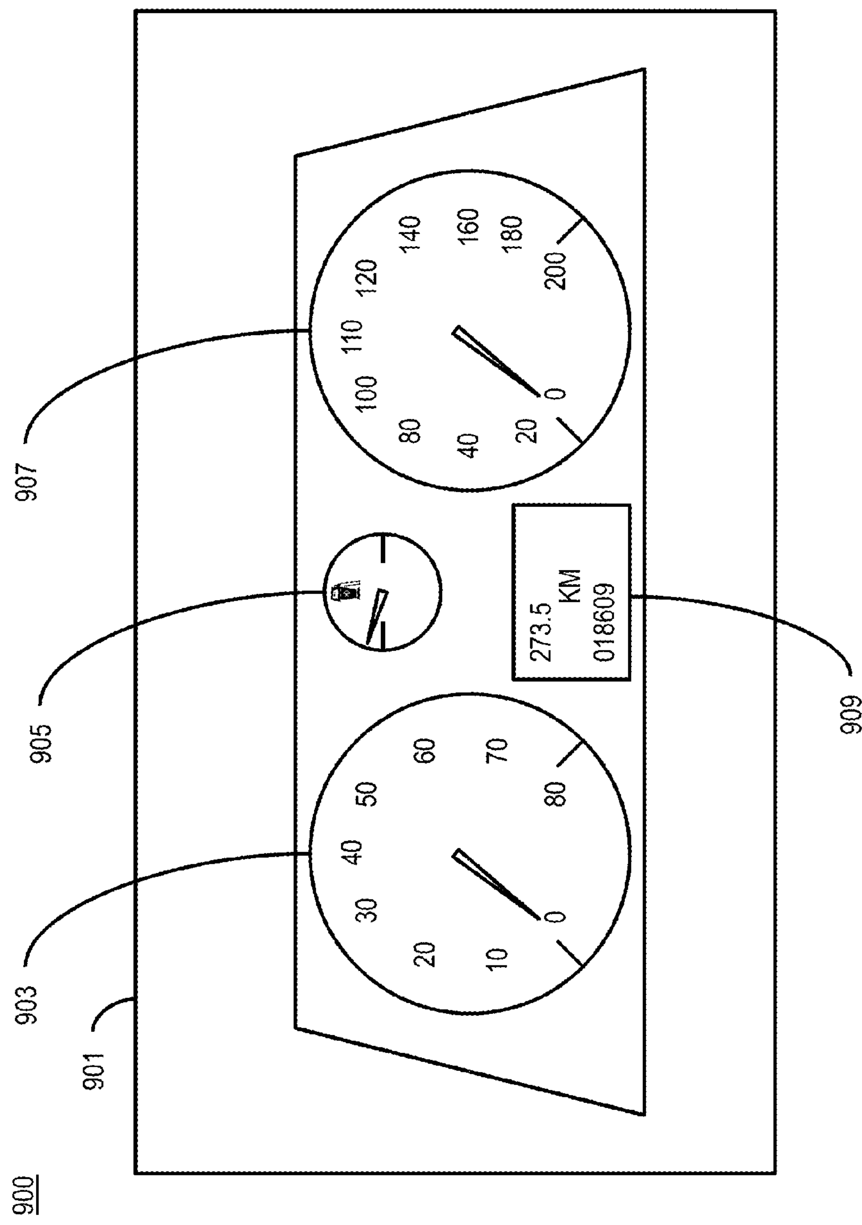
FIGS. 9A through 9E illustrate an integrated vehicle instrument panel and various user interfaces at a user device for presenting various information items at a user device, according to various embodiments.

FIGS. 9A through 9E illustrate an integrated vehicle instrument panel and various user interfaces at a user device for presenting various information items at a user device, according to various embodiments;

FIG. 9A depicts a diagram 900 where an integrated in-vehicle instrument panel 901 includes various instruments for presenting various information items associated with the vehicle and possible inside/outside environmental information. In one example, the instrument panel includes a tachometer 903 (presenting the RPM information of the vehicle's engine), a fuel gauge 905, a speedometer 907, and an odometer 909.

Figure 9B:
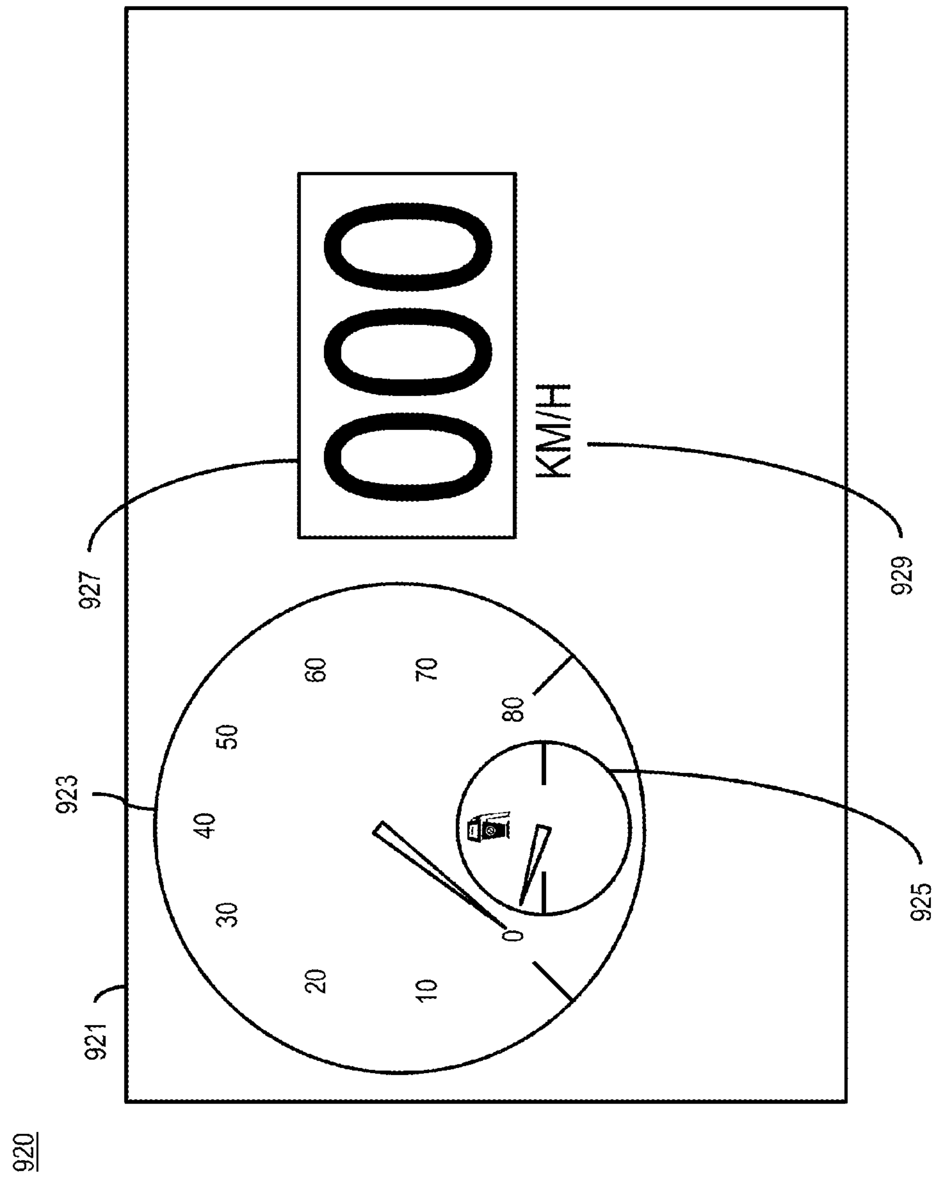

Referring to FIG. 9B, it depicts a diagram 920 where a user device 921 is utilized to request, detect, capture, determine, and display various information items associated with the in-vehicle instrument panel 901, one or more information items available from one or more sensors, one or more possible inside/outside environmental information, and the like. In one embodiment, the user device 921 may include one or more cameras, wherein the user device may be placed in front of the instrument panel 901 and at least one camera on the user device 921 is facing in the direction of the instrument panel 901. In one embodiment, the user device 921 detect, determine and display a tachometer instrument 923 and a fuel gauge 925, which may be presented in a similar or a different format (e.g., analog), size, color, illumination, placement position, and the like when compared to the same instruments of the integrated in-vehicle instrument panel 901. In one embodiment, the user device 921 may detect the speedometer instrument 907 in analog in the integrated in-vehicle instrument panel 901, but may present it in a digital format 927 with additional unit of measurement 929 in km/h. In various embodiments, a user device may or may not display all instrument information detected and/or determine in an integrated in-vehicle instrument panel, for example, the odometer information 909 of the integrated in-vehicle instrument panel 901 is not presented at the user device 921, which may be due to a user preference, a device configuration, a priority list, and the like.

Figure 9C:
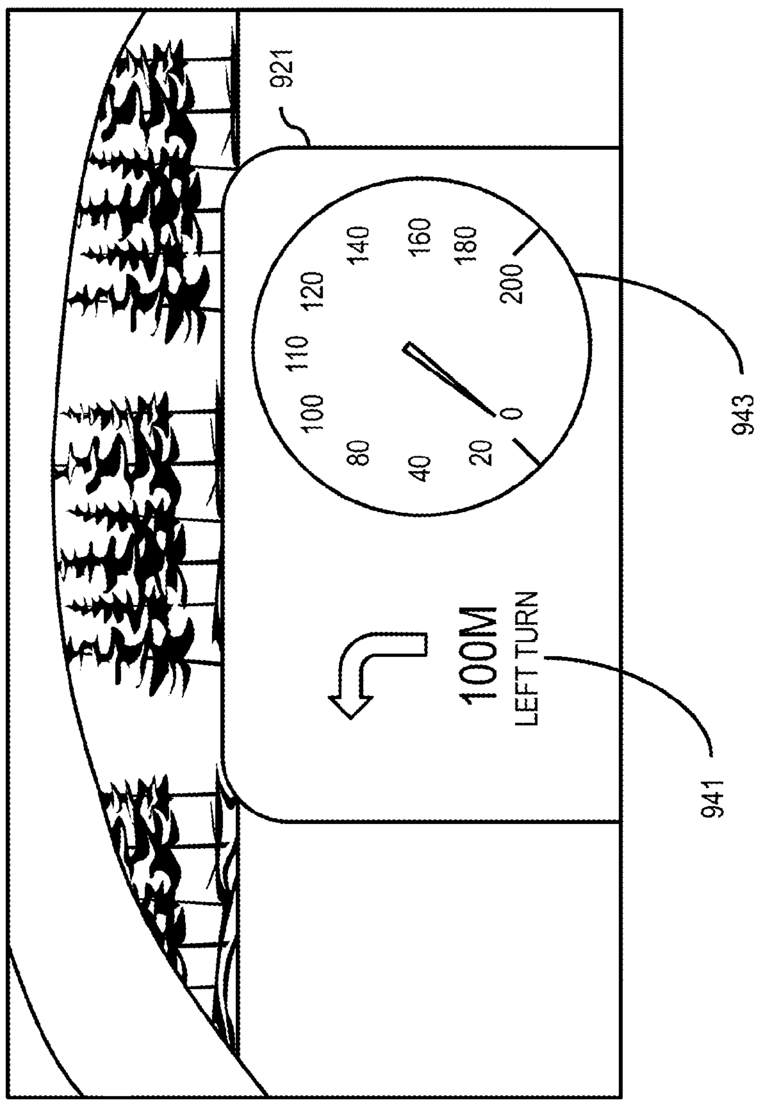

As depicted in FIG. 9C, a diagram 940 includes the user device 921 is utilized to present a speedometer 943, which may be based on the speedometer 907 of the integrated in-vehicle instrument panel 901 and/or may be based on one or more information items available from one or more other instruments (e.g., a distance measurement from the odometer 909 divided by a duration of travel for a given distance), one or more sensors, service providers, and the like. In one embodiment, one or more navigation information items may be presented on the user device 921, for example, a turn-by-turn instructions 941.

Figure 9D:
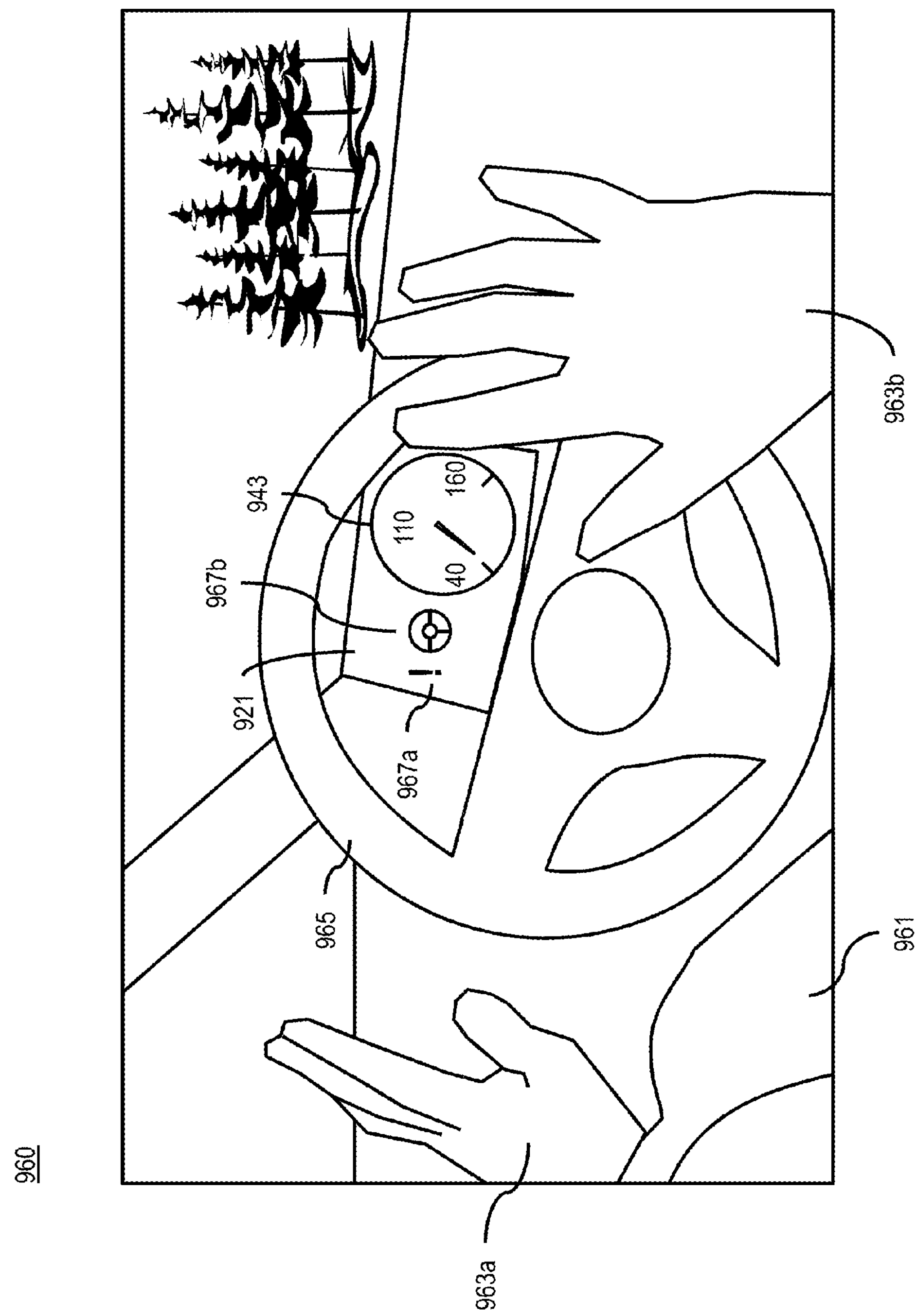

FIG. 9D depicts a diagram 960 where the user device 921 is placed directly in from of the integrated in-vehicle instrument panel 901, wherein at least one camera on the user device 921 is facing in the direction of the integrated in-vehicle instrument panel 901 (forward) and at least one camera is facing in the direction of a user 961 (rearward.) In one embodiment, the rearward camera may detect that the user 961 has disengaged his hands 963*a* and 963*b* from the steering-wheel 965 of the vehicle, wherein one or more warning notifications 967*a* and 967*b* may be presented at the user device 921 in addition to or in place of one or more other information items. For example, the speedometer 943 is still presented, but the navigation information 941 is no longer presented in the diagram 960, which may be based, at least in part, on the user preferences, a device configuration, a priority list, user display size, and the like.

Figure 9E:
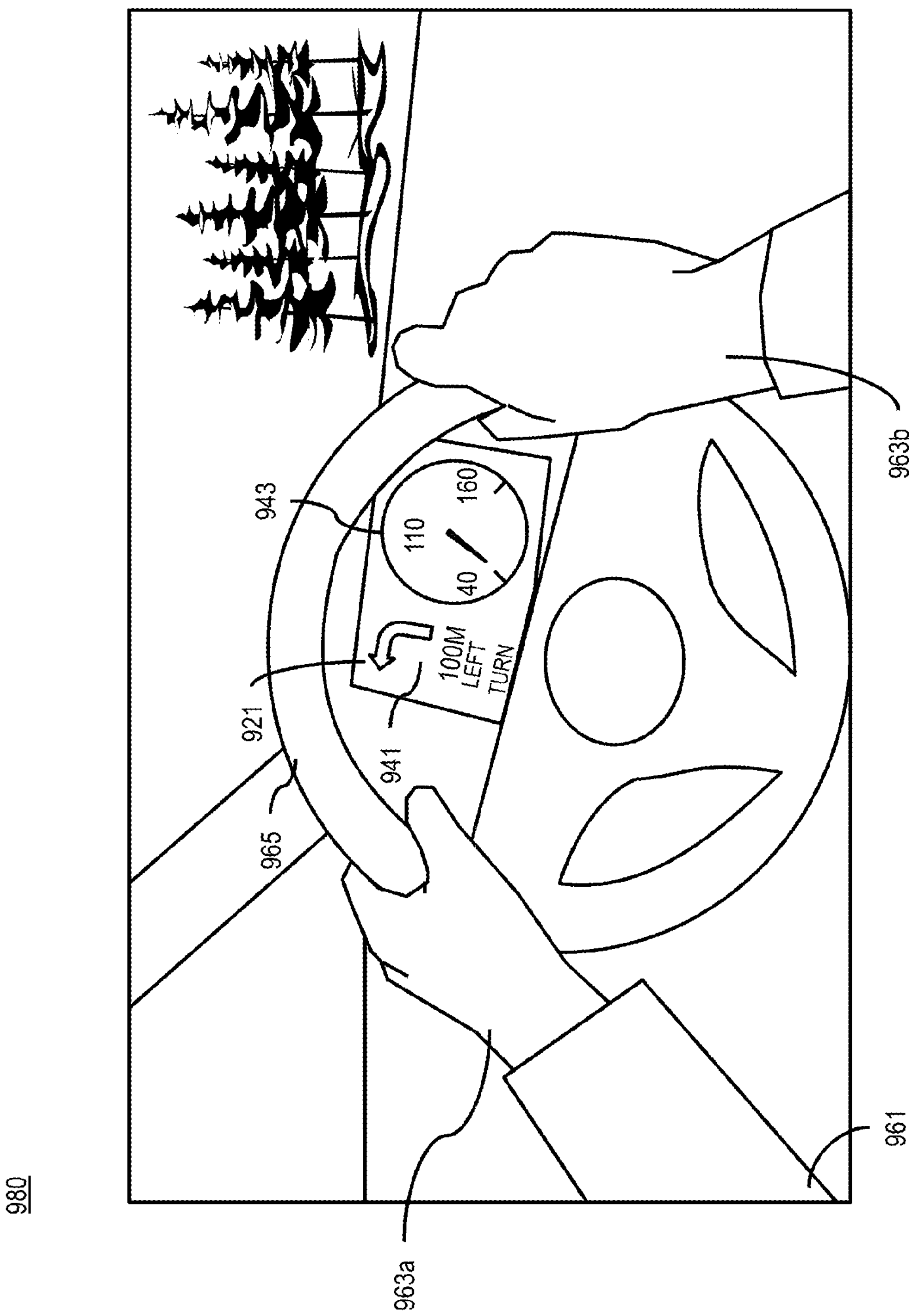

As shown in FIG. 9E, a diagram 980 where the user device 921 may detect that the user 961 has engaged his one or more hands 963*a* and/or 963*b* with the steering-wheel 965, wherein the user device 921 may no longer present the one or more warning notifications 967*a* and 967*b* at the user device 921 and instead may present the turn-by-turn instructions 941.

The processes described herein for complementing various devices and/or instruments by utilizing augmented reality and providing an adaptive user interface at a user device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to complement various devices and/or instruments by utilizing augmented reality and providing an adaptive user interface at a user device as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of complementing various devices and/or instruments by utilizing augmented reality and providing an adaptive user interface at a user device.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to complementing various devices and/or instruments by utilizing augmented reality and providing an adaptive user interface at a user device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for complementing various devices and/or instruments by utilizing augmented reality and providing an adaptive user interface at a user device. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for complementing various devices and/or instruments by utilizing augmented reality and providing an adaptive user interface at a user device, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 113 for complementing various devices and/or instruments by utilizing augmented reality and providing an adaptive user interface at a user device.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

Figure 11:
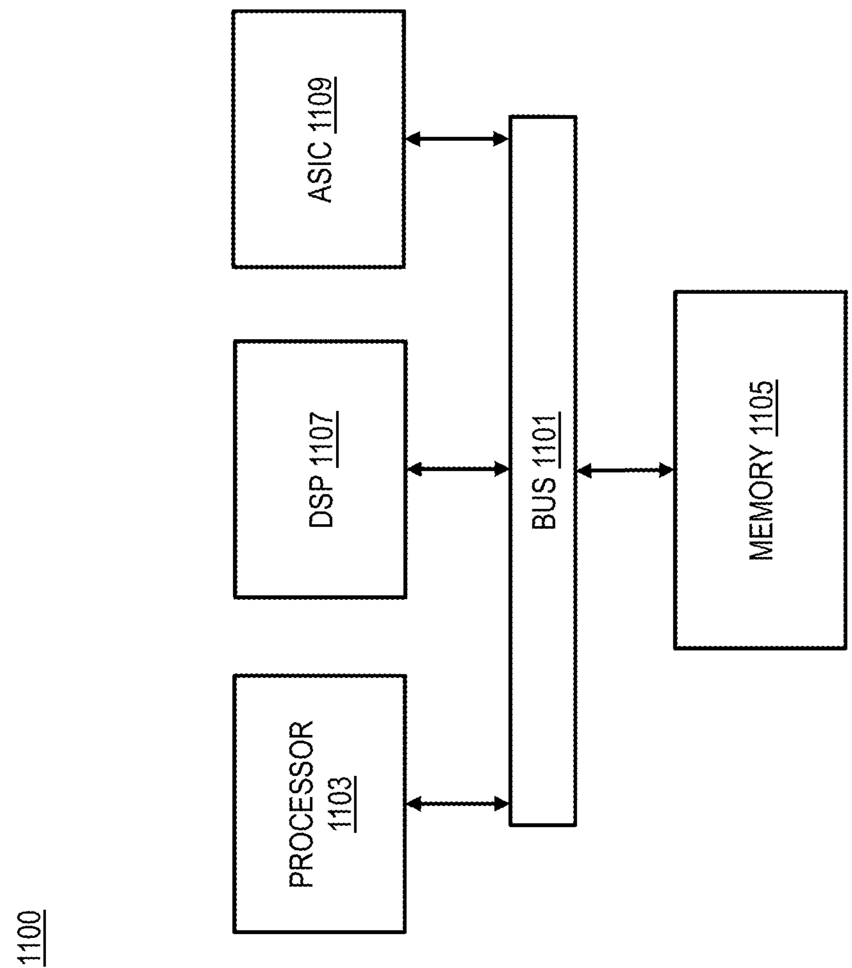
FIG. 11 is a diagram of a chip set that can be used to implement an embodiment of the invention.

FIG. 11 illustrates a chip set or chip 1100 upon which an embodiment of the invention may be implemented. Chip set 1100 is programmed to complement various devices and/or instruments by utilizing augmented reality and providing an adaptive user interface at a user device as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of complementing various devices and/or instruments by utilizing augmented reality and providing an adaptive user interface at a user device.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to complementing various devices and/or instruments by utilizing augmented reality and providing an adaptive user interface at a user device. The memory 1105 also stores the data associated with or generated by the execution of the inventive steps.

Figure 12:
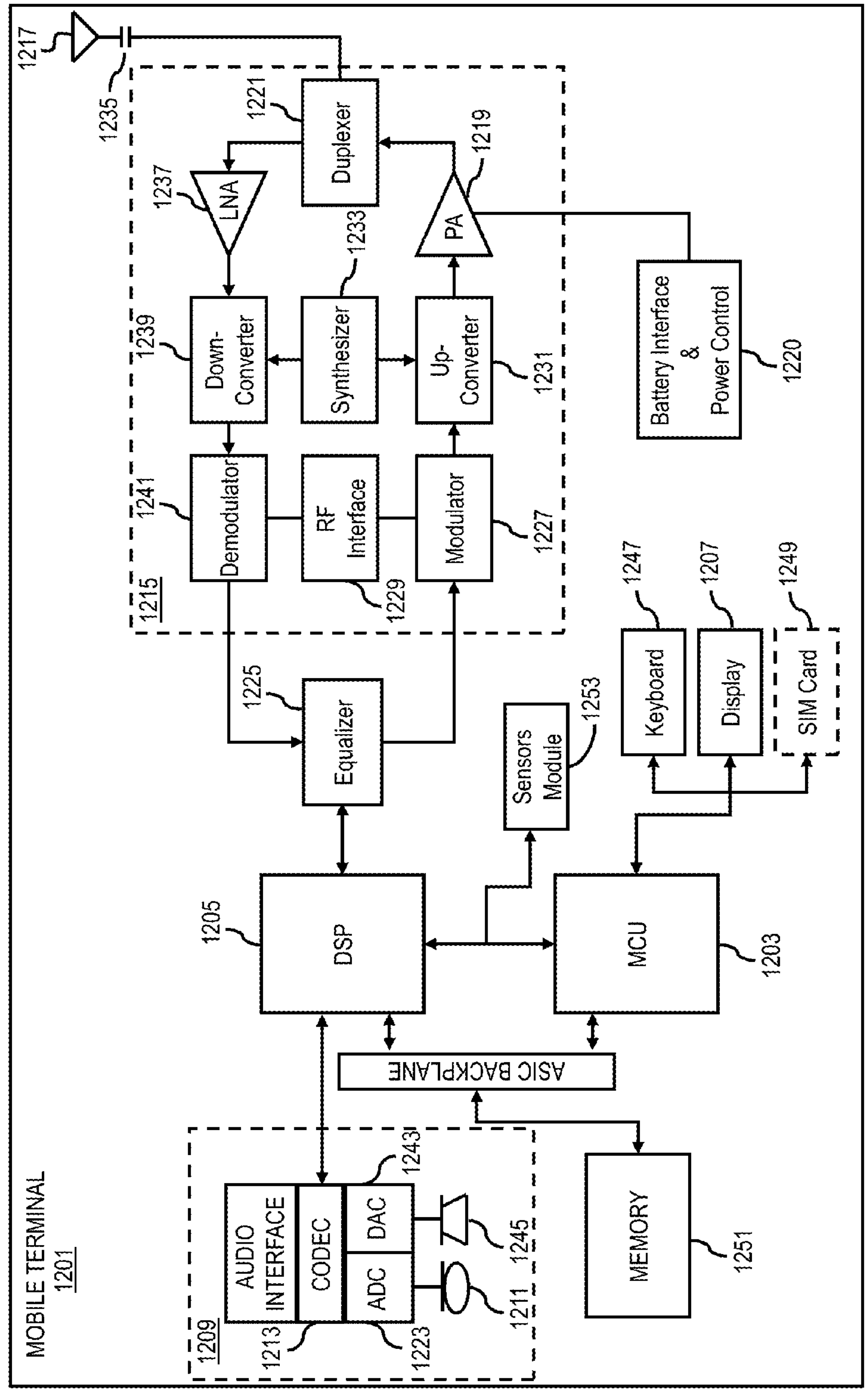
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of complementing various devices and/or instruments by utilizing augmented reality and providing an adaptive user interface at a user device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of complementing various devices and/or instruments by utilizing augmented reality and providing an adaptive user interface at a user device. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to complement various devices and/or instruments by utilizing augmented reality and providing an adaptive user interface at a user device. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Additionally, sensors module 1253 may include various sensors, for instance, a location sensor, a speed sensor, an audio sensor, an image sensor, a brightness sensor, a biometrics sensor, various physiological sensors, a directional sensor, and the like, for capturing various data associated with the mobile terminal 1201 (e.g., a mobile phone), a user of the mobile terminal 1201, an environment of the mobile terminal 1201 and/or the user, or a combination thereof, wherein the data may be collected, processed, stored, and/or shared with one or more components and/or modules of the mobile terminal 1201 and/or with one or more entities external to the mobile terminal 1201.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of or processing (1) data, (2) information, or (3) at least one signal, the (1) data, (2) information, or (3) at least one signal based, at least in part, on the following:

at least one determination of one or more information items associated with at least one instrument panel of at least one vehicle;

at least one determination of one or more representations of the one or more information items; and a presentation of the one or more information items at at least one device based, at least in part, on a priority level of the one or more information items, wherein the at least one device substitutes for the at least one instrument panel, and wherein the at least one device determines the priority level for the one or more information items based on one or more of a user preference, a user defined threshold value, urgency of the information item, or service provider information.

2. A method of claim 1, wherein the one or more information items are received via one or more communication links to one or more sensors associated with the at least one vehicle, one or more service providers, or a combination thereof.

3. A method of claim 1, wherein the one or more information items are determined via one or more optical sensors, one or more audio sensors, or a combination thereof on the at least one device.

4. A method comprising facilitating a processing of or processing (1) data, (2) information, or (3) at least one signal, the (1) data, (2) information, or (3) at least one signal based, at least in part, on the following:

at least one determination of one or more information items associated with at least one instrument panel of at least one vehicle;

at least one determination of one or more representations of the one or more information items;

a processing of the one or more information items to determine priority information; and a presentation of the one or more information items at at least one device, wherein the at least one device substitutes for the at least one instrument panel, wherein the presentation of the one or more information items at the at least one device is based, at least in part, on the priority information, and wherein the (1) data, (2) information, or (3) at least one signal are further based, at least in part, on the following:

at least one determination of, at the at least one device, one or more inaccuracies in the one or more information items; and an update to the priority information based, at least in part, on the one or more inaccuracies.

5. A method of claim 4, wherein the (1) data, (2) information, or (3) at least one signal are further based, at least in part, on the following:

at least one determination of one or more sensors associated with the one or more inaccuracies;

a presentation of one or more notifications via a user interface at the at least one device indicative of the one or more inaccuracies;

at least one determination of one or more user inputs via the user interface; and the update based, at least in part, on the one or more user inputs.

6. A method of comprising facilitating a processing of or processing (1) data, (2) information, or (3) at least one signal, the (1) data, (2) information, or (3) at least one signal based, at least in part, on the following:

at least one determination of one or more information items associated with at least one instrument panel of at least one vehicle;

at least one determination of one or more representations of the one or more information items; and a presentation of the one or more information items at at least one device, wherein the at least one device substitutes for the at least one instrument panel, and wherein the (1) data, (2) information, or (3) at least one signal are further based, at least in part, on the following:

the presentation of the one or more information items based, at least in part, on one or more user preferences, one or more user histories, or a combination thereof.

7. A method of claim 6, wherein the (1) data, (2) information, or (3) at least one signal are further based, at least in part, on the following:

a configuration of a display area on the at least one device based, at least in part, on the one or more priorities, one or more information types, the one or more user preferences, the one or more user histories, the one or more inaccuracies, or a combination thereof.

8. A method of claim 7, wherein the configuration of the display area on the at least one device, the presentation of the one or more information items, or a combination thereof is based, at least in part, on a type of the vehicle.

9. A method of claim 7, wherein the (1) data, (2) information, or (3) at least one signal are further based, at least in part, on the following:

a storing of the one or more information items, the configuration of the display area, information of the vehicle, or a combination thereof at the at least one device.

10. An apparatus comprising:

at least one processor; and at least one memory including computer program code for one or more programs, the at least one memory and the computer program code configured to, with the at least one processor, cause the apparatus to perform at least the following, determine one or more information items associated with at least one instrument panel of at least one vehicle;

determine one or more representations of the one or more information items; and cause, at least in part, a presentation of the one or more information items at at least one device based, at least in part, on a priority level of the one or more information items, wherein the at least one device substitutes for the at least one instrument panel, and wherein the at least one device determines the priority level for the one or more information items based on one or more of a user preference, a user defined threshold value, urgency of the information item, or service provider information.

11. An apparatus of claim 10, wherein the one or more information items are received via one or more communication links to one or more sensors associated with the at least one vehicle, one or more service providers, or a combination thereof.

12. An apparatus of claim 10, wherein the one or more information items are determined via one or more optical sensors, one or more audio sensors, or a combination thereof on the at least one device.

13. An apparatus comprising:

at least one processor; and at least one memory including computer program code for one or more programs, the at least one memory and the computer program code configured to, with the at least one processor, cause the apparatus to perform at least the following, determine one or more information items associated with at least one instrument panel of at least one vehicle;

determine one or more representations of the one or more information items;

process or facilitate a processing of the one or more information items to determine priority information; and cause, at least in part, a presentation of the one or more information items at at least one device, wherein the at least one device substitutes for the at least one instrument panel, wherein the presentation of the one or more information items at the at least one device is based, at least in part, on the priority information, and wherein the apparatus is further caused to:

determine, at the at least one device, one or more inaccuracies in the one or more information items; and cause, at least in part, an update to the priority information based, at least in part, on the one or more inaccuracies.

14. An apparatus of claim 12, wherein the apparatus is further caused to:

determine one or more sensors associated with the one or more inaccuracies;

cause, at least in part, a presentation of one or more notifications via a user interface at the at least one device indicative of the one or more inaccuracies;

determine one or more user inputs via the user interface; and cause, at least in part, the update based, at least in part, on the one or more user inputs.

15. An apparatus comprising:

at least one processor; and at least one memory including computer program code for one or more programs, the at least one memory and the computer program code configured to, with the at least one processor, cause the apparatus to perform at least the following, determine one or more information items associated with at least one instrument panel of at least one vehicle;

determine one or more representations of the one or more information items; and cause, at least in part, a presentation of the one or more information items at at least one device, wherein the at least one device substitutes for the at least one instrument panel, and wherein the apparatus is further caused to:

cause, at least in part, the presentation of the one or more information items based, at least in part, on one or more user preferences, one or more user histories, or a combination thereof.

16. An apparatus of claim 15, wherein the apparatus is further caused to:

cause, at least in part, a configuration of a display area on the at least one device based, at least in part, on the one or more priorities, one or more information types, the one or more user preferences, the one or more user histories, the one or more inaccuracies, or a combination thereof.

17. An apparatus of claim 16, wherein the configuration of the display area on the at least one device, the presentation of the one or more information items, or a combination thereof is based, at least in part, on a type of the vehicle.

18. An apparatus of claim 16, wherein the apparatus is further caused to:

cause, at least in part, a storing of the one or more information items, the configuration of the display area, information of the vehicle, or a combination thereof at the at least one device.

* * * * *

UNITED STATES PATENT AND TRADEMARK OFFICE

CERTIFICATE OF CORRECTION

PATENT NO. : 8,712,632 B2
APPLICATION NO. : 13/754308
DATED : April 29, 2014
INVENTOR(S) : Marko Tapio Tuukkanen It is certified that error appears in the above-identified patent and that said Letters Patent is hereby corrected as shown below:

On the Title Page item (73), Assignee information which reads “NAVTEQ B.V. Veldhoven, (NL)” should read --HERE Global B.V., Veldhoven (NL)--.

Signed and Sealed this
Eighth Day of September, 2015

Michelle K. Lee
*Director of the United States Patent and Trademark Office*